United States Patent
Park et al.

(10) Patent No.: US 12,022,595 B2
(45) Date of Patent: Jun. 25, 2024

(54) COOKING APPLIANCE

(71) Applicant: LG ELECTRONICS INC., Seoul (KR)

(72) Inventors: Jinwoo Park, Seoul (KR); Il Young Park, Seoul (KR); Myoeng Soo Park, Seoul (KR); Dayeong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 391 days.

(21) Appl. No.: 17/354,026

(22) Filed: Jun. 22, 2021

(65) Prior Publication Data

US 2021/0410236 A1 Dec. 30, 2021

(30) Foreign Application Priority Data

Jun. 26, 2020 (KR) .................... 10-2020-0078186

(51) Int. Cl.
*H05B 6/06* (2006.01)
*H05B 6/12* (2006.01)

(52) U.S. Cl.
CPC .......... *H05B 6/062* (2013.01); *H05B 6/1209* (2013.01); *H05B 6/1272* (2013.01)

(58) Field of Classification Search
CPC .... H05B 6/1209; H05B 6/062; H05B 6/1245; H05B 6/1272; H05B 2206/022; H05B 2213/07; Y02B 40/00
See application file for complete search history.

(56) References Cited

U.S. PATENT DOCUMENTS

| 2004/0245244 A1 | 12/2004 | Hirota et al. |
| 2021/0289592 A1 | 9/2021 | Cha et al. |

FOREIGN PATENT DOCUMENTS

| EP | 3 879 928 | | 9/2021 | |
| JP | S61-42799 | | 3/1986 | |
| JP | H09-89270 | | 4/1997 | |
| JP | 2008-226573 | | 9/2008 | |
| JP | 2008226573 A | * | 9/2008 | ............. H05B 6/062 |
| KR | 20140124106 A | * | 10/2014 | ............. H05B 6/02 |
| KR | 10-2016-0025170 | | 3/2016 | |
| KR | 20160025170 A | * | 3/2016 | ................ F24C 7/08 |

OTHER PUBLICATIONS

European Search Report dated Nov. 23, 2021 issued in EP Application No. 21181433.0.

* cited by examiner

*Primary Examiner* — Dana Ross
*Assistant Examiner* — Kuangyue Chen
(74) *Attorney, Agent, or Firm* — KED & ASSOCIATES

(57) ABSTRACT

A cooking appliance may include a holder disposed in an induction heating element provided below a cover plate, and a supporter disposed inside the holder that supports a sensor inserted into the holder to contact the sensor to the cover plate.

12 Claims, 16 Drawing Sheets

COOKING APPLIANCE

CROSS-REFERENCE TO RELATED APPLICATION(S)

This application claims priority to and the benefit of Korean Patent Application No. 10-2020-0078186, filed in Korea on Jun. 26, 2020, the disclosure of which is incorporated herein by reference in its entirety.

BACKGROUND

1. Field

A cooking appliance is disclosed herein.

2. Background

A cooking appliance may cook food or other items (hereinafter collectively "food") by generating heat using gas or electricity. A typical cooking appliance using electricity may be an induction heating cooking appliance. A basic heating principle of the induction heating cooking appliance is that food items contained in a container are cooked by heating by induction heating of the cooking container; The cooking container includes a magnetic substance, and a current is applied to a heating coil. The induction heating cooking appliance may not generate combustion exhaust gas and may heat food items at a high speed.

The induction heating cooking appliance may include a body, a working coil, and a cover plate. A substrate may be disposed inside the body and a base plate may be disposed on the body.

A working coil may be disposed on the base plate. The working coil may include an insulating sheet and a ferrite. The working coil may be disposed on the insulating sheet and the ferrite may be disposed on the base plate.

The cover plate may be disposed on the body. More specifically, the cover plate may be disposed on the working coil. An object to be heated may be placed on the cover plate.

The working coil may form a magnetic field using a current flowing through the working coil. The magnetic field may generate heat in the cooking container itself, which is an object to be heated placed on the cover plate, by the induction heating. The generated heat may heat food contained in the cooking container. A substrate may control circuits to provide an induced current to the working coil.

The induction heating cooking appliance may include a temperature sensor to measure a temperature. The temperature sensor may measure the temperature of the cover plate in contact with the cover plate. The temperature sensor may be placed on the working coil base constituting the working coil.

As the temperature sensor measures the temperature of the cover plate in contact with the cover plate, accuracy of the temperature measurement by the temperature sensor may increase when a degree of contact between the temperature sensor and the cover plate is high. However, if the degree of contact between the temperature sensor and the cover plate is increased, a risk of damage to the temperature sensor or the cover plate may increase due to an impact applied to the cover plate. If the degree of contact between the temperature sensor and the cover plate is lowered, accuracy of the temperature measurement by the temperature sensor may be lowered.

In addition, the induction heating cooking appliance may include a fuse for temperature control in case of overheating. The fuse may be placed on the working coil base similar to the temperature sensor. For the placement, a holder in which a temperature fuse is disposed may be placed on the working coil base.

Korean Patent Publication No. 10-2016-0025170, which is hereby incorporated by reference, discloses a fuse mounting structure of an induction range. The fuse mounting structure of the induction range includes a fuse holder to prevent separation of a temperature fuse.

The fuse holder is placed at a central portion of the working coil base and a temperature fuse is inserted into the fuse holder. Separation prevention guides are disposed at both sides of an upper side of an edge of the fuse holder. The separation prevention guide functions to prevent the temperature fuse accommodated in the fuse holder from being separated to the outside.

The separation prevention guide is provided as an engaging protrusion to simply restrict movement of the temperature fuse. The separation prevention guide prevents the temperature fuse from being separated to the outside and also blocks insertion of the temperature fuse into the fuse holder. For this reason, it becomes difficult to insert the temperature fuse into the fuse holder, and difficulty of assembling the temperature fuse increases.

Further, in the above structure, the temperature fuse contacts a lower surface of the cover plate made of glass. Therefore, in the above structure, collision between the cover plate and the temperature fuse occurs due to an impact applied to the cover plate from the outside and the cover plate may be damaged by the collision.

In addition, even if damage to the cover plate due to the collision is not generated, the temperature sensor may not properly absorb the impact applied to the temperature sensor through the cover plate, thereby increasing a risk of malfunction or damage of the temperature sensor. When the temperature sensor malfunctions or is damaged, the temperature of the induction range may not be properly controlled, thereby increasing a possibility of disconnection of the temperature fuse.

In the above structure, a mounting structure to fix the temperature sensor and a holder to fix the temperature fuse are separately provided, and the temperature sensor and the temperature fuse are separately assembled to separate objects. That is, in the above structure, assembly of the temperature sensor and assembly of the temperature fuse are performed separately, thereby increasing a number of assembly processes.

BRIEF DESCRIPTION OF THE DRAWINGS

Embodiments will be described in detail with reference to the following drawings in which like reference numerals refer to like elements, and wherein.

DETAILED DESCRIPTION

Figure 1:
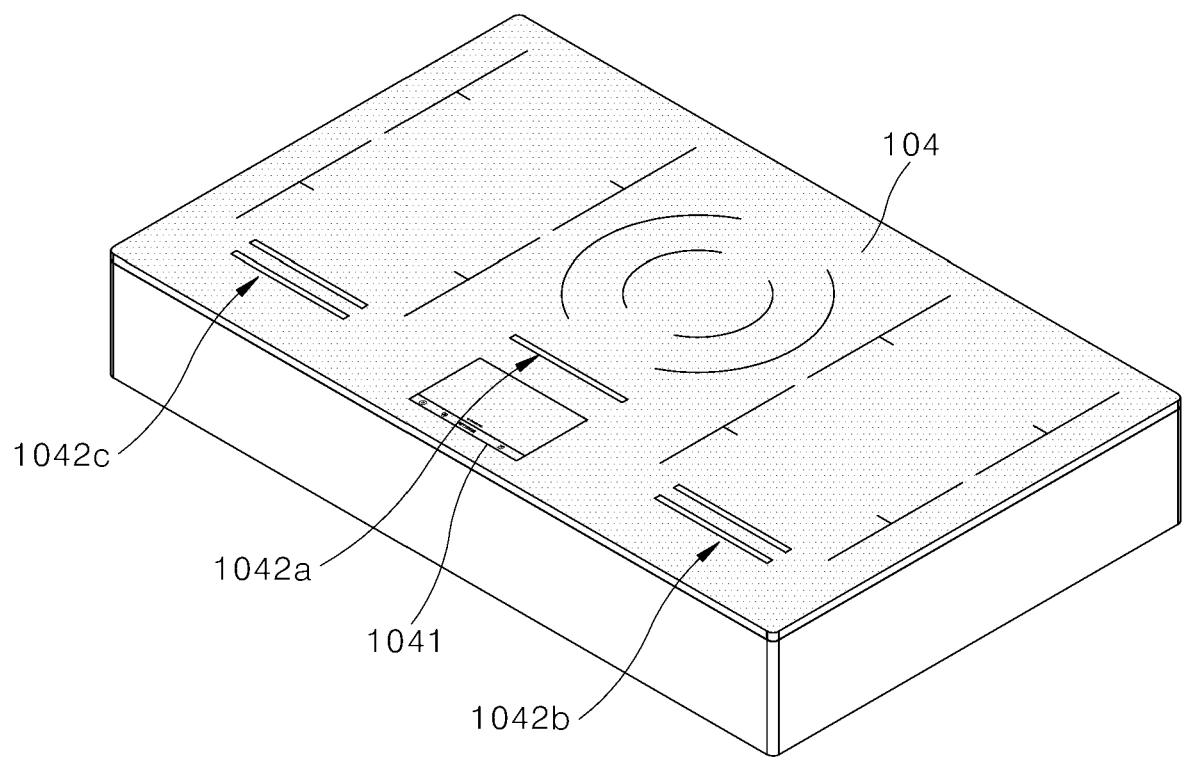
FIG. 1 is a perspective view of a cooking appliance according to an embodiment.

Embodiments are described with reference to accompanying drawings. Therefore, a person having ordinary knowledge in the art to which embodiments pertain will be able to easily embody the technical idea. Description of well-known technology relating to embodiments may be omitted if it unnecessarily obscures the gist. Hereinafter, embodiments are described with reference to the accompanying drawings. Same reference numerals may be used to refer to same or similar components.

Terms such as first, second, and the like may be used herein to describe various elements of the present disclosure; however, these elements are not limited by these terms. These terms are intended to distinguish one element from another element. A first element may be a second element unless otherwise stated.

In this document, the terms "upper," "lower," "on," "under," or the like are used such that, where a first component is arranged at "an upper portion" or "a lower portion" of a second component, the first component may be arranged in contact with the upper surface or the lower surface of the second component, or another component may be disposed between the first component and the second component. Similarly, where a first component is arranged on or under a second component, the first component may be arranged directly on or under (in contact with) the second component, or one or more other components may be disposed between the first component and the second component.

Further, the terms "connected," "coupled," or the like are used such that, where a first component is connected or coupled to a second component, the first component may be directly connected or able to be connected to the second component, one or more additional components may be disposed between the first and second components, or the first component may be connected, coupled, or be able to be connected to the second component via additional components.

Unless otherwise stated, each component may be singular or plural throughout the disclosure.

As used herein, the singular forms "a," "an" and "the" are intended to include the plural forms as well, unless the context clearly indicates otherwise. In the present disclosure, it should not be construed that terms such as "including" or "comprising" necessarily include various types of components or various steps described in the present disclosure, and it should be construed terms such as "including" or "comprising" do not include some components or some steps or may include additional components or steps.

Unless otherwise stated, "A and/or B" means A, B, or both. Unless otherwise stated, "C to D" means "C or more and D or less".

Figure 2:
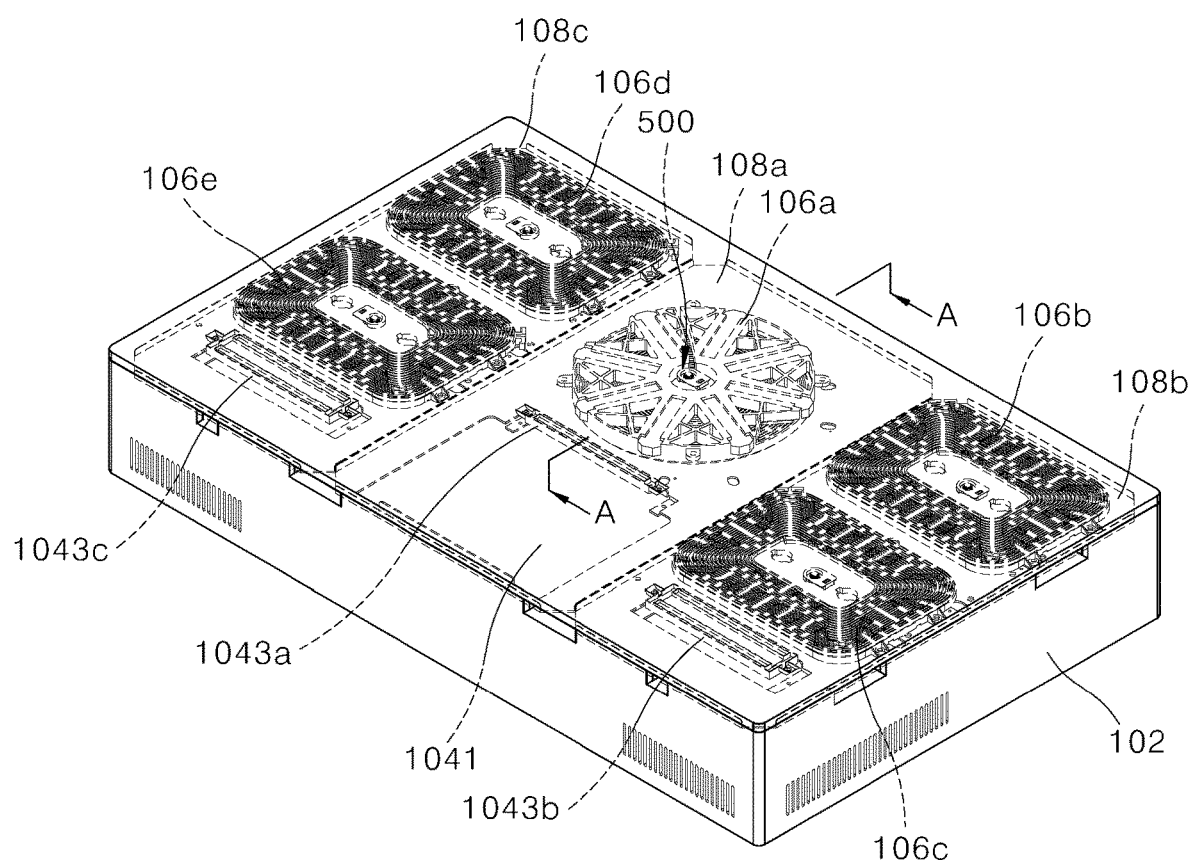
FIG. 2 is a perspective view of the cooking appliance of FIG. 1, with a cover plate omitted.
Figure 3:
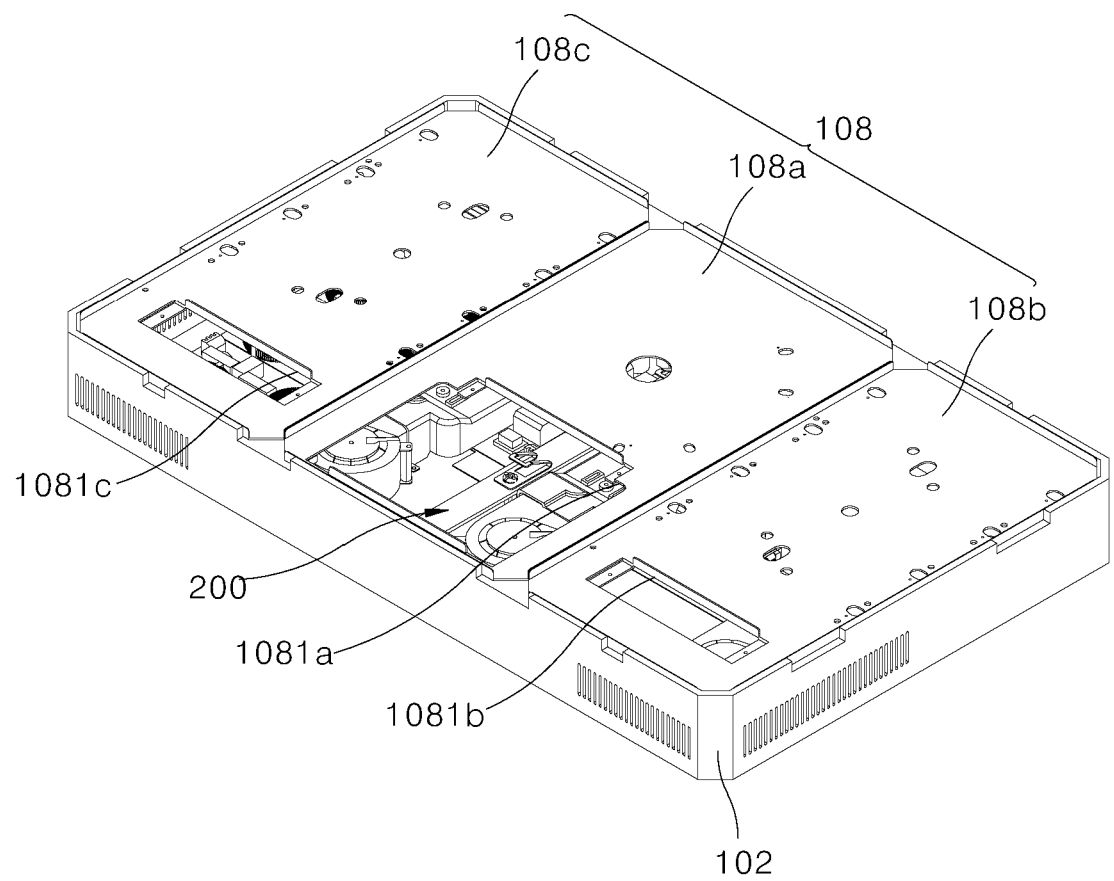
FIG. 3 is a perspective view of the cooking appliance in FIG. 2, with a working coil omitted.
Figure 4:
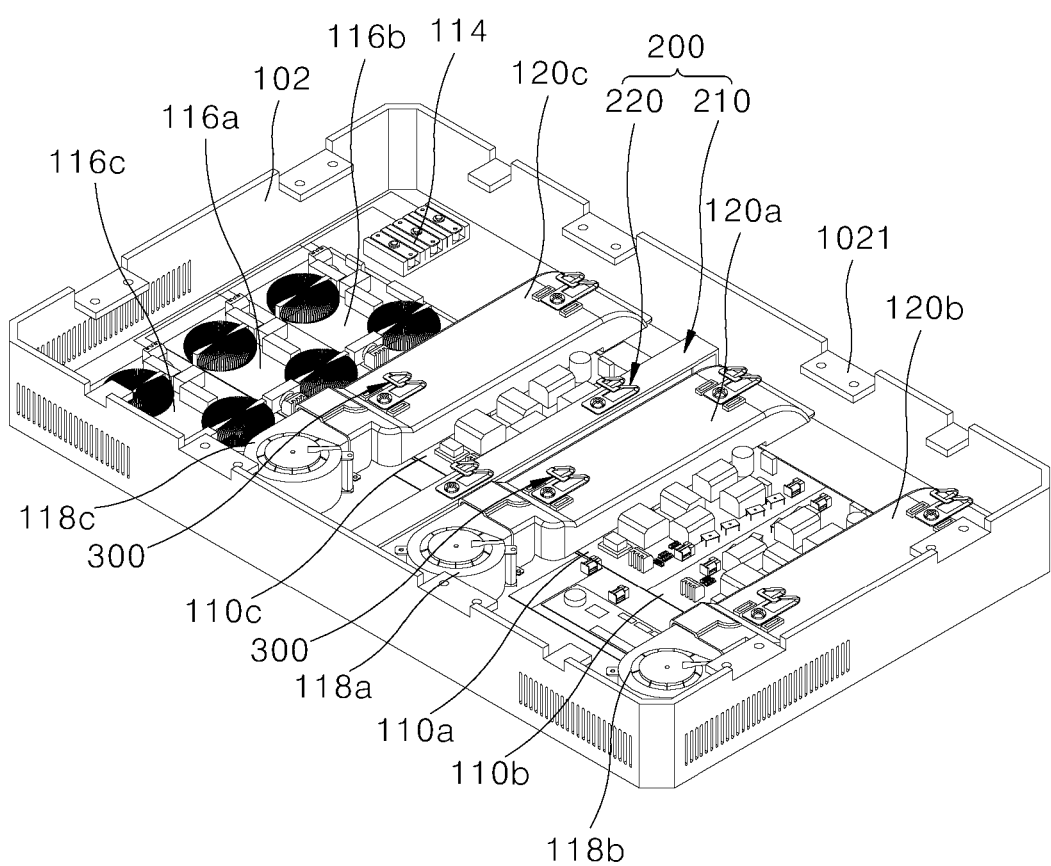
FIG. 4 is a perspective view of the cooking appliance in FIG. 3, with base plates omitted.
Figure 5:
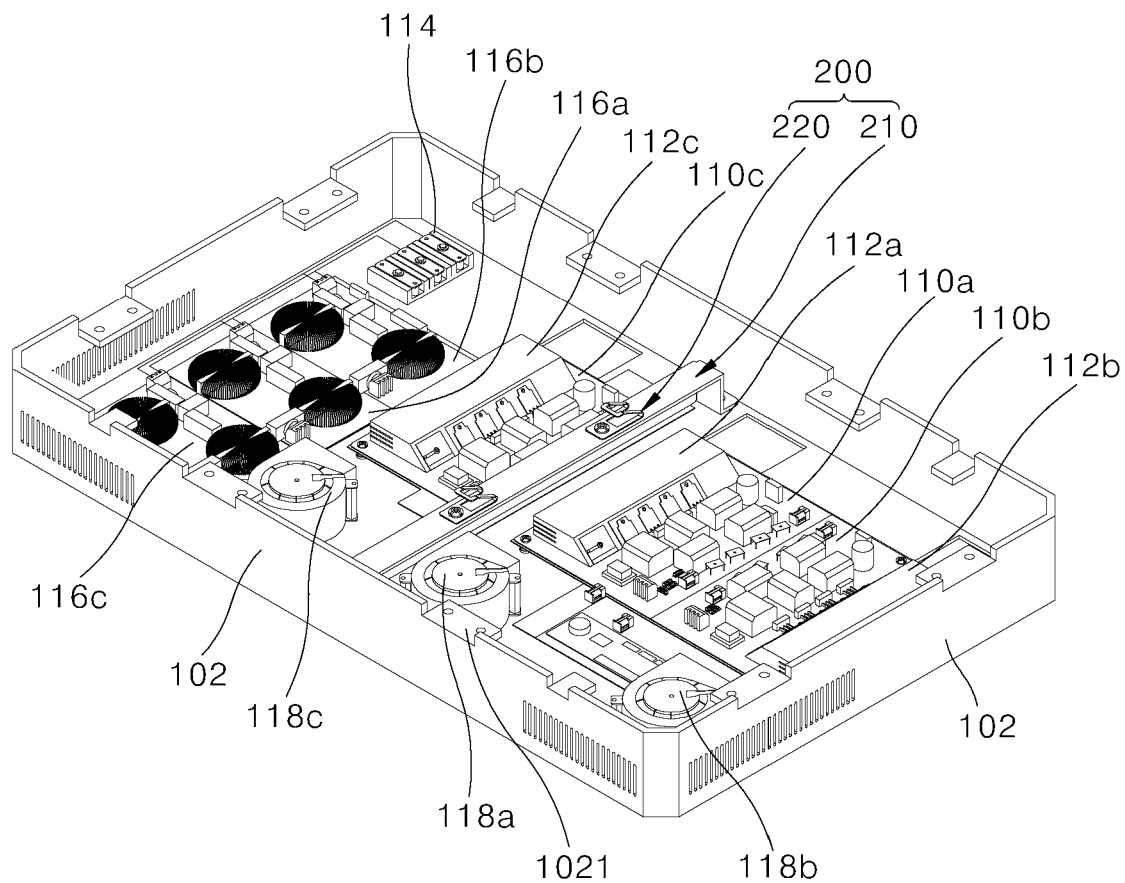
FIG. 5 is a perspective view of the cooking appliance in FIG. 4, with air guides omitted.

FIG. 1 is a perspective view of a cooking appliance according to an embodiment. FIG. 2 is a perspective view of the cooking appliance in FIG. 1, with a cover plate omitted. FIG. 3 is a perspective view of the cooking appliance in FIG. 2, with a working coil omitted. In addition, FIG. 4 is a perspective view of the cooking appliance in FIG. 3, with base plates omitted, and FIG. 5 is a perspective view of the cooking appliance in FIG. 4, with air guides omitted.

Hereinafter, structure of a cooking appliance according to an embodiment is described with reference to FIGS. 1 to 5.

In this embodiment, a cooking appliance in the form of an electric range is illustrated. The cooking appliance exemplified herein may include an electric resistance-type electric range and an induction heating-type electric range.

An embodiment is described based on the electric range including a working coil as a heater. However, embodiments are not limited thereto.

Referring to FIGS. 1 to 3, the cooking appliance according to an embodiment may include a case 102, a cover plate 104, a working coil 420 (106a-106e), and one or more base plates 108 (108a, 108b, and 108c).

The case 102 may have a polygonal shape with an open top. The case 102 may accommodate various internal components of the cooking appliance and may protect the internal components of the cooking appliance. For example, the case 102 may have a shape of a quadrangular box and made of aluminum, for example; however, embodiments are not limited thereto. The case 102 may be thermally insulated to suppress an increase in temperature of an outer surface of the case 102 due to heat generated by the working coil 106a-106e. The case 102 may have an opening at an upper side thereof.

The cover plate 104 may be disposed on the case 102. The cover plate 104 may close an upper side or opening of the case 102 and may define an upper appearance of the cooking appliance.

The cover plate 104 may be made of ceramic glass, for example, and may have a rectangular flat plate shape with a thickness, for example. An object to be heated may be disposed on the cover plate 104 and may be heated by the working coil 420.

An input interface 1041 may be disposed on an upper surface of the cover plate 104 to receive input from a user. The input interface 1041 may be flush with the upper surface of the cover plate 104 and may display a specific image. The input interface 1041 may receive a touch input from the user and the cooking appliance may be driven based on the received touch input.

The input interface 1041 may be provided to input a heating intensity or a heating time desired by the user, for example and may be implemented as a physical button or a touch panel, for example. The input interface 1041 may indicate a drive state of the cooking appliance. For example, the input interface 1041 may be a thin film transistor liquid crystal display (TFT LCD); however, embodiments are not limited thereto.

Light display areas 1042a, 1042b, and 1042c may be provided on the upper surface of the cover plate 104. Light source units 1043a, 1043b, and 1043c may be disposed under the cover plate 104. Light emitted from the light source units 1043a, 1043b, and 1043c may be transmitted to the user through the light display areas 1042a, 1042b, and 1042c.

The working coil 106a-106e may be a heater to heat an object and may be disposed inside the case 102. The working coil 106a-106e may include a conductive wire that is annularly wound a plurality of times and may generate an alternating magnetic field. A mica sheet and/or a ferrite core may be sequentially disposed below the working coil 106a-106e.

The ferrite core may be coupled to the mica sheet by a sealant. The ferrite core may diffuse the alternating magnetic field generated by the working coil 106a-106e. The mica sheet may be coupled to the working coil 106a-106e and the ferrite core by the sealant. The mica sheet may prevent the heat generated by the working coil 106a-106e from being directly transferred to the ferrite core.

A plurality of working coils 106a-106e may be disposed in the cooking appliance. In this embodiment, it is exemplified that five working coils are disposed in the cooking appliance. For example, first working coil 106a may be disposed at a central portion of the case 102. Second working coil 106b and third working coil 106c may each be disposed on a right (first) side of the first working coil 106a, and fourth working coil 106d and fifth working coil 106d may each be disposed on a left (second) side of the first working coil 106a. However, the number of working coils may be other than (higher, or lower) five and also the arrangement inside the case may be different. For example, there may an embodiment having three working coils arranged next to each other or four working coils arranged in four quadrants of the case. Further, embodiments may also be applied to a single working coil and to a range having only one working coil.

The second working coil 106b and the third working coil 106c may be arranged vertically on the right side of the first working coil 106a, and the fourth working coil 106d and the fifth working coil 106e may be arranged vertically on the left side of the first working coil 106a. For example, the first working coil 106a may be a high-power dual heating coil, and the second working coil 106b, the third working coil 106c, the fourth working coil 106d, and the fifth working coil 106e may be a single heating coil. The first working coil 106a, which is the dual heating coil, may have a heavy weight and a maximum output of the first working coil 106a may be 7000 kW.

The cooking appliance according to an embodiment may also perform a wireless power transmission function based on the above-described configuration and characteristics. That is, technology for wirelessly supplying power may be developed and applied to a plurality of electronic devices. Batteries of electronic devices using the wireless power transmission technology are charged by simply placing them on a charging pad rather than connecting an additional charging connector. The electronic device to which the wireless power transmission technology is applied may not need a wired cord or a charger, thereby improving portability thereof and reducing a size and a weight thereof compared to the related art.

The wireless power transmission technology may include an electromagnetic induction method using a coil, a resonance method using resonance, and a radio wave radiation method to convert electrical energy into microwaves and transmit them. The electromagnetic induction method transmits power using electromagnetic induction between a first coil (for example, a working coil) of a wireless power transmitting device and a second coil of a wireless power receiving device.

The induction heating method of the cooking appliance uses the principle of electromagnetic induction. Therefore, the principle of the induction heating method is substantially the same as the wireless power transmission technology by electromagnetic induction. Therefore, the cooking appliance according to an embodiment may perform a wireless power transmission function as well as the induction heating function.

The base plates 108a, 108b, and 108c may each be disposed in a middle of the case 102, that is, approximately at a central portion in a heightwise or vertical direction between a lower portion and an upper portion of the case 102. The plurality of working coils 420 may be disposed on the base plates 108a, 108b, and 108c, that is, in an upper portion of the case 102. The base plates 108a, 108b, and 108c may provide a seating surface to receive the one or more working coils 106a-106e and may support the one or more working coils 106a-106e having a heavy weight. The input interface 1042 and the one or more light source units 1043a, 1043b, and 1043c may be further disposed on the base plates 108a, 108b, and 108c.

In this embodiment, it is exemplified that the plurality of base plates 108a, 108b, and 108c are each disposed inside the case 102. For example, the plurality of base plates 108a, 108b, and 108c, which are provided separately, may be disposed in the case 102 in a horizontal direction. However, embodiments are not limited thereto, and a base plate may be disposed inside the case 102, and all of the working coils may be supported by a single base plate.

According to an embodiment, the first base plate 108a, the second base plate 108b, and the third base plate 108c may each be disposed inside the case 102. The first base plate 108a, the second base plate 108b, and the third base plate 108c may be arranged side by side at the middle in the heightwise direction of the case 102.

The first base plate 108a may be disposed at a center of the middle of the case 102, that is, in a horizontal layer between the second and third base plates 108b, 108c. The first working coil 106a may be disposed on the first base plate 108a. The first light source unit 1043a corresponding to the input interface 1041 and the first working coil 106a may be further disposed on the first base plate 108a. The first base plate 108a may include a first through-hole 1081a.

The input interface 1041 and the first light source unit 1043a may each be disposed on the first base plate 108a and may pass through the first base plate 108a via the first through-hole 1081a. In this case, an upper portion of each of the input interface 1041 and the first light source unit 1043a may be exposed above the first base plate 108a, and a lower portion of each of the input interface 1041 and the first light source unit 1043a may be exposed to a space defined under the first base plate 108a.

The second base plate 108b may be disposed on the right side of the first base plate 108a at the middle of the case 102. The second working coil 106b and the third working coil 106c may each be disposed on the second base plate 108b.

The second light source unit 1043b corresponding to or associated with the second working coil 106b and the third working coil 106c may be disposed on the second base plate 108b. The second working coil 106b, the third working coil 106c, and the second light source unit 1043b may be disposed on the second base plate 108b. The second base plate 108b may include a second through-hole 1081b.

The second light source unit 1043b may be disposed on the second base plate 108b and may pass through the second base plate 108b via the second through-hole 1081b. In this case, an upper portion of the second light source unit 1043b may be exposed above the second base plate 108b and a lower portion of the second light source unit 1043*b* may be exposed to a space defined under the second base plate 108*b*.

The third base plate 108*c* may be disposed on the left side of the first base plate 108*a* at the middle in the heightwise direction of the case 102. The fourth working coil 106*d* and the fifth working coil 106*e* may each be disposed on the third base plate 108*c*.

The third light source unit 1043*c* corresponding to or associated with the fourth working coil 106*d* and the fifth working coil 106*e* may be disposed on the third base plate 108*c*. The fourth working coil 106*d*, the fifth working coil 106*e*, and the third light source unit 1043*c* may be disposed on the third base plate 108*c*. The third base plate 108*c* may include a third through-hole 1081*c*.

The third light source unit 1043*c* may be disposed on the third base plate 108*c* and may pass through the third base plate 108*c* via the third through-hole 1081*c*. In this case, an upper portion of the third light source unit 1043*c* may be exposed above the third base plate 108*c* and a lower portion of the third light source unit 1043*c* may be exposed to a space defined under the third base plate 108*c*.

Referring to FIGS. 2 to 4, a plurality of seating portions 1021 may be disposed at a portion of a side surface of the case 102 to receive the plurality of base plates 108*a*, 108*b*, and 108*c* thereon. That is, edges of the plurality of base plates 108*a*, 108*b*, and 108*c* may be placed on the plurality of seating portions 1021, and accordingly, the plurality of base plates 108*a*, 108*b*, and 108*c* may be disposed in the middle in the heightwise direction of the case 102. The seating portions 1021 may be bent or arranged to protrude horizontally inside the space formed by the case 102. A position of the seating portions in the heightwise direction is determined so that the base plates are arranged substantially at the middle in the heightwise direction of the case.

Drive circuits 110*a*, 110*b*, and 110*c* may control driving of the plurality of working coils 106*a*-106*c*, which are heaters, and may further control driving of components of the cooking appliance such as the input interface 1041 or light source units. Various components related to the driving of the working coil 106*a*-106*c* may be disposed in the drive circuits 110*a*, 110*b*, and 110*c*. For example, the drive circuits 110*a*, 110*b*, and 110*c* may include a power supply to provide alternating current (AC) power, a rectifier to rectify the AC power of the power supply into a direct current (DC) power, an inverter to convert the DC power rectified by the rectifier to a resonance current based on a switching operation and provide it to the working coil 106*a*-106*e*, a microcomputer (for example, a micom) to control the inverter and components related to the driving thereof, and a relay or a semiconductor switch to turn on or off the working coil 106*a*-106*e*.

As shown in FIGS. 2 to 5, the drive circuits 110*a*, 110*b*, and 110*c* may include first drive circuit 110*a*, second drive circuit 110*b*, and third drive circuit 110*c*. The first drive circuit 110*a* may be disposed on the right side of a lower portion of the case 102 with respect to a bracket 210 and may control driving of the first working coil 106*a*. The second drive circuit 110*b* may be disposed on the right side of the first drive circuit 110*a* and may control driving of the second working coil 106*b* and the third working coil 106*c*. The third drive circuit 110*c* may be disposed on the left side of the lower portion of the case 102 with respect to the bracket 210 and may control the driving of the fourth working coil 106*d* and the fifth working coil 106*e*.

One or more heat sinks 112*a*, 112*b*, and 112*c* may be disposed on a portion of the drive circuits 110*a*, 110*b*, and 110*c*. The one or more heat sinks 112*a*, 112*b*, and 112*c* may prevent an increase in temperature of components disposed at portions of the drive circuits 110*a*, 110*b*, and 110*c*.

The heat sinks 112*a*, 112*b*, and 112*c* may include first heat sink 112*a*, second heat sink 112*b*, and third heat sink 112*c*. The first heat sink 112*a* may prevent an increase in temperature of a component disposed at a portion of the first drive circuit 110*a*, the second heat sink 112*b* may prevent an increase in temperature of the component disposed at a portion of the second drive circuit 110*b*, and the third heat sink 112*c* may prevent an increase in temperature of the component disposed at the portion of the third drive circuit 110*c*.

A power inlet 114 may be provided to supply external power to the cooking appliance. The power inlet 114 may be implemented as a terminal block.

The power inlet 114 may be disposed at one of edges of a bottom surface of the case 102. For example, the power inlet 114 may be disposed on an upper left side of the bottom surface of the case 102.

Filter circuits 116*a*, 116*b*, and 116*c* may be disposed at one of the edges of the bottom surface of the case 102. The filter circuits 116*a*, 116*b*, and 116*c* may reduce noise generated by the plurality of working coils 420.

The filter circuits 116*a*, 116*b*, and 116*c* may include first filter circuit 116*a*, second filter circuit 116*b*, and third filter circuit 116*c*. The first filter circuit 116*a* may reduce noise generated by the first working coil 106*a*. The second filter circuit 116*b* may reduce noise generated by the second working coil 106*b* and the third working coil 106*c*. The third filter circuit 116*c* may reduce noise generated by the fourth working coil 106*d* and the fifth working coil 106*e*.

Blowing fans 118*a*, 118*b*, and 118*c* may be provided to cool an internal temperature of the case 102. The blowing fans 118*a*, 118*b*, and 118*c* may cool a temperature of various components disposed on/in the drive circuits 110*a*, 110*b*, and 110*c*.

In this embodiment, the blowing fans 118*a*, 118*b*, and 118*c* includes first blowing fan 118*a*, second blowing fan 118*b*, and third blowing fan 118*c*. The first blowing fan 118*a* may cool various components disposed on/in the first drive circuit 110*a* and/or also cool light source unit 1043 corresponding to the first working coil 106*a*. In addition, the first blowing fan 118*a* may transmit cold air to the first heat sink 112*a* disposed on the first drive circuit 110*a*.

The second blowing fan 118*b* may cool various components disposed on/in the second drive circuit 110*b* and/or may cool light source unit 1043 corresponding to the second working coil 106*b* and the third working coil 106*c*. The second blowing fan 118*b* may transmit cold air to the second heat sink 112*b* disposed on the second drive circuit 110*b*.

The third blowing fan 118*c* may cool various components disposed on/in the third drive circuit 110*c* and/or may cool light source unit 1043 corresponding to the fourth working coil 106*d* and the fifth working coil 106*e*. The third blowing fan 118*c* may transmit cold air to the third heat sink 112*c* disposed on the third drive circuit 110*c*.

Referring to FIGS. 4 and 5, air guides 120*a*, 120*b*, and 120*c* may guide airflow (air) generated from the blowing fans 118*a*, 118*b*, and 118*c*. The air guides 120*a*, 120*b*, and 120*c* may include first air guide 120*a*, second air guide 120*b*, and third air guide 120*c*.

The first air guide 120*a* may cover the first heat sink 112*a* disposed on a portion of the first drive circuit 110*a*. The first air guide 120*a* may guide air blown by the first blowing fan 118*a* to the first heat sink 112*a*.

The second air guide 120*b* may cover the second heat sink 112*b* disposed on a portion of the second drive circuit 110*b*.

The second air guide 120*b* may guide air blown by the second blowing fan 118*b* to the second heat sink 112*b*.

The third air guide 120*c* may cover the third heat sink 112*c* disposed on a portion of the third drive circuit 110*c*. The third air guide 120*c* may guide air blown by the third blowing fan 118*c* to the third heat sink 112*c*.

An elastic supporter 300 may be disposed on at least one or on each of the air guides 120*a*, 120*b*, and 120*c*. The elastic supporter 300 may have a leaf spring shape. The elastic supporter 300 may elastically support a lower surface of each of the base plates 108*a*, 108*b*, and 108*c* disposed above the air guides 120*a*, 120*b*, and 120*c*. In this case, the elastic supporter 300 may support the lower surface of a central portion of the base plates 108*a*, 108*b*, and 108*c*. The elastic supporter 300 may support the lower surface of the central portion of the working coil 420 disposed on the base plates 108*a*, 108*b*, and 108*c*.

A supporter 200 may be disposed in the case 102. The supporter 200 may include bracket 210 and/or an elastic member 220.

The bracket 210 may be disposed at a central portion below the first base plate 108*a*. The bracket 210 may prevent bending (for example, sagging of the base plate 108*a*) due to a weight of the first base plate 108*a*. In this case, the weight of the first base plate 108*a* may be understood as including a weight of the first working coil 106*a* disposed on the first base plate 108*a*.

At least one elastic member 220 may be disposed on the bracket 210. For example, the elastic member 220 may be a leaf spring. An upper surface of the elastic member 220 may contact a lower surface of the first base plate 108*a*. The elastic member 220 may elastically support the lower surface of the central portion of the first base plate 108*a*. The elastic member 220 may support the lower surface of the central portion of the working coil 420 disposed on the first base plate 108*a*.

The elastic member 220 may contribute to suppressing bending of the first base plate 108*a* by elastically supporting the first base plate 108*a* from under the first base plate 108*a*.

Figure 6:
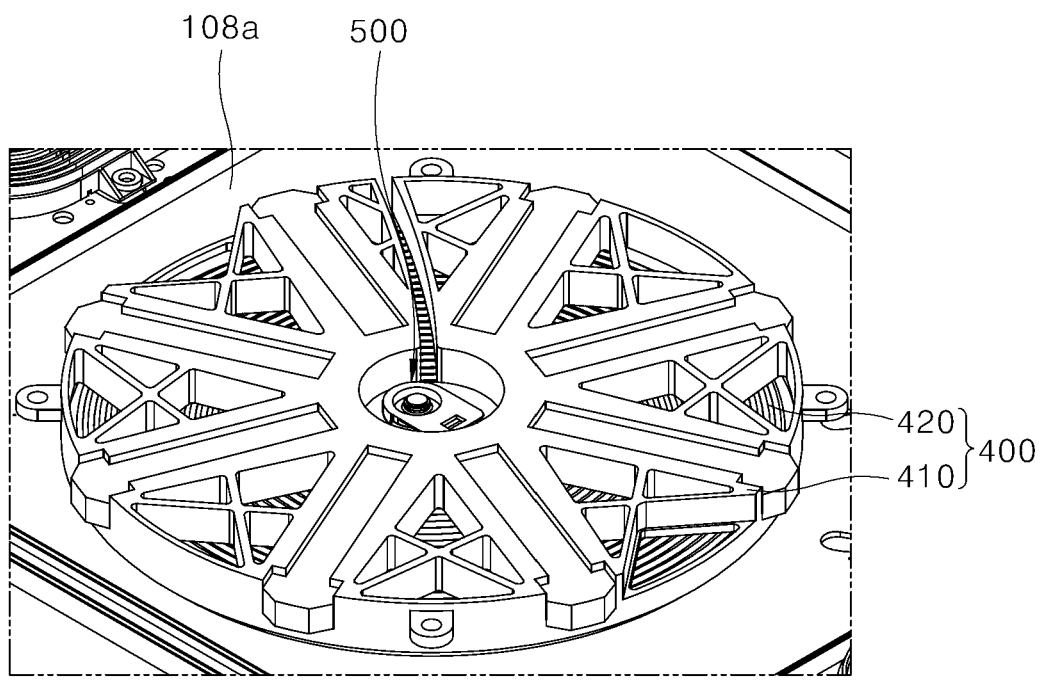
FIG. 6 is a partially enlarged view of the cooking appliance in FIG. 2.
Figure 7:
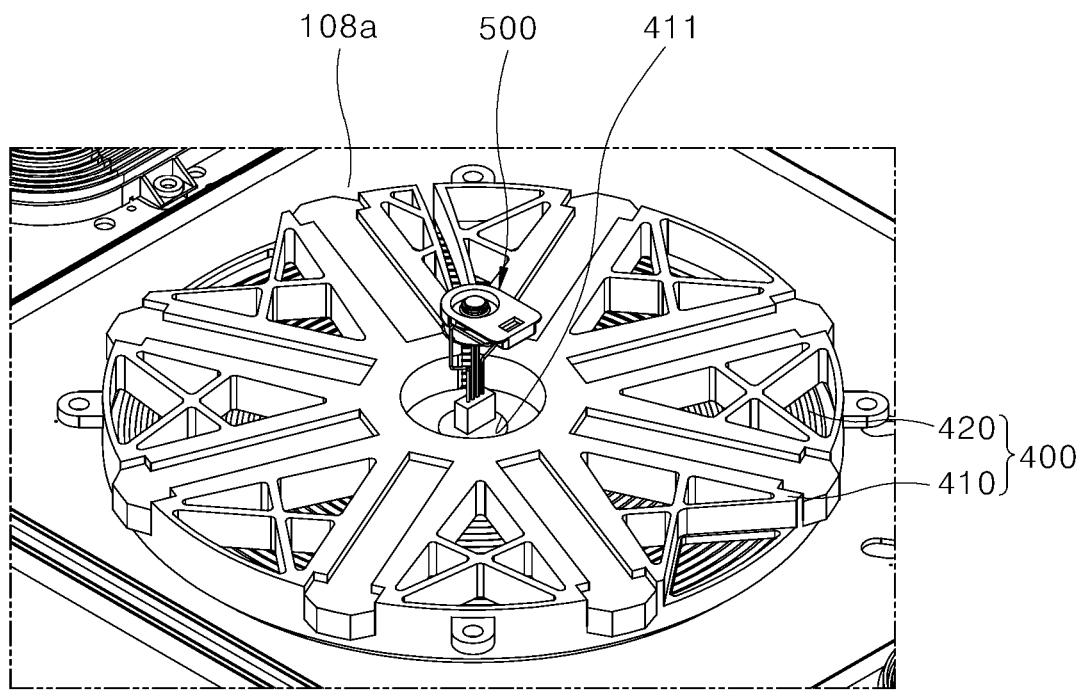
FIG. 7 is an exploded perspective view showing a sensing portion and a holder in FIG. 6 separated from a working coil.
Figure 8:
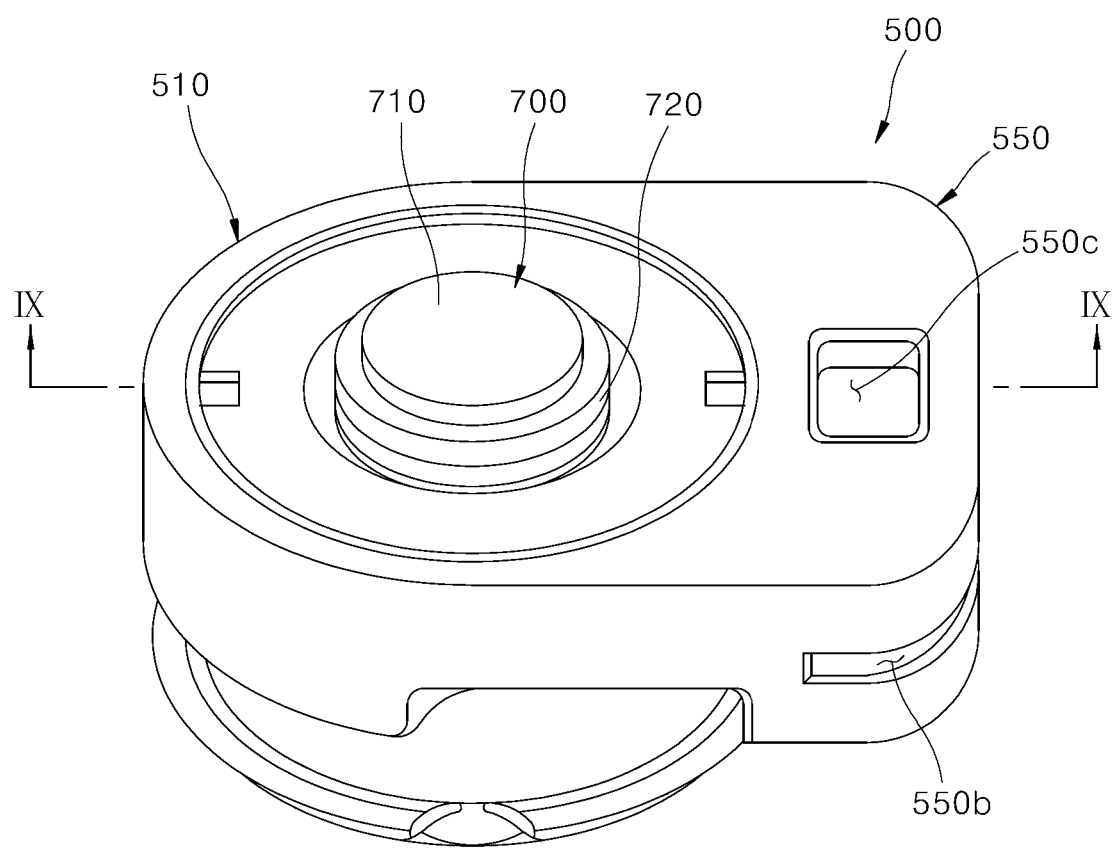
FIG. 8 is a perspective view showing a coupled state between a holder and a sensing module.
Figure 9:
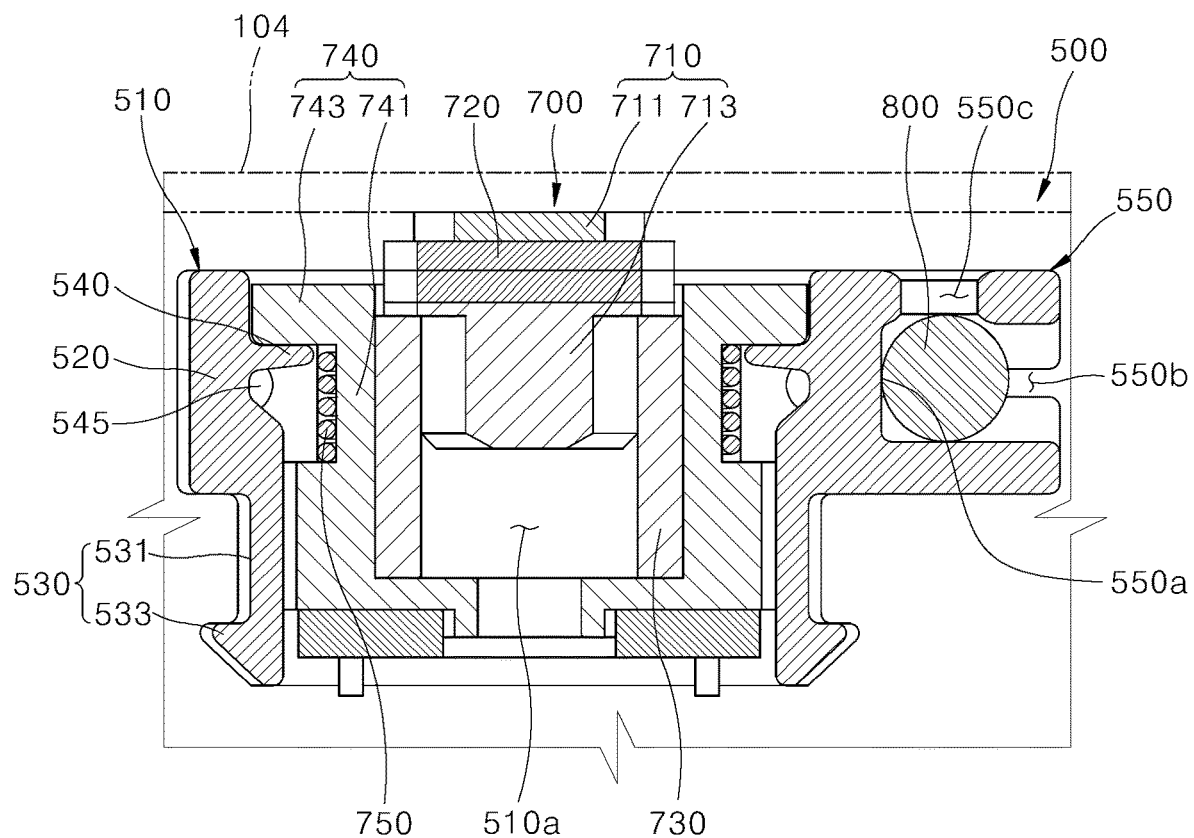
FIG. 9 is a cross-sectional view, taken along line "IX-IX" of FIG. 8.
Figure 10:
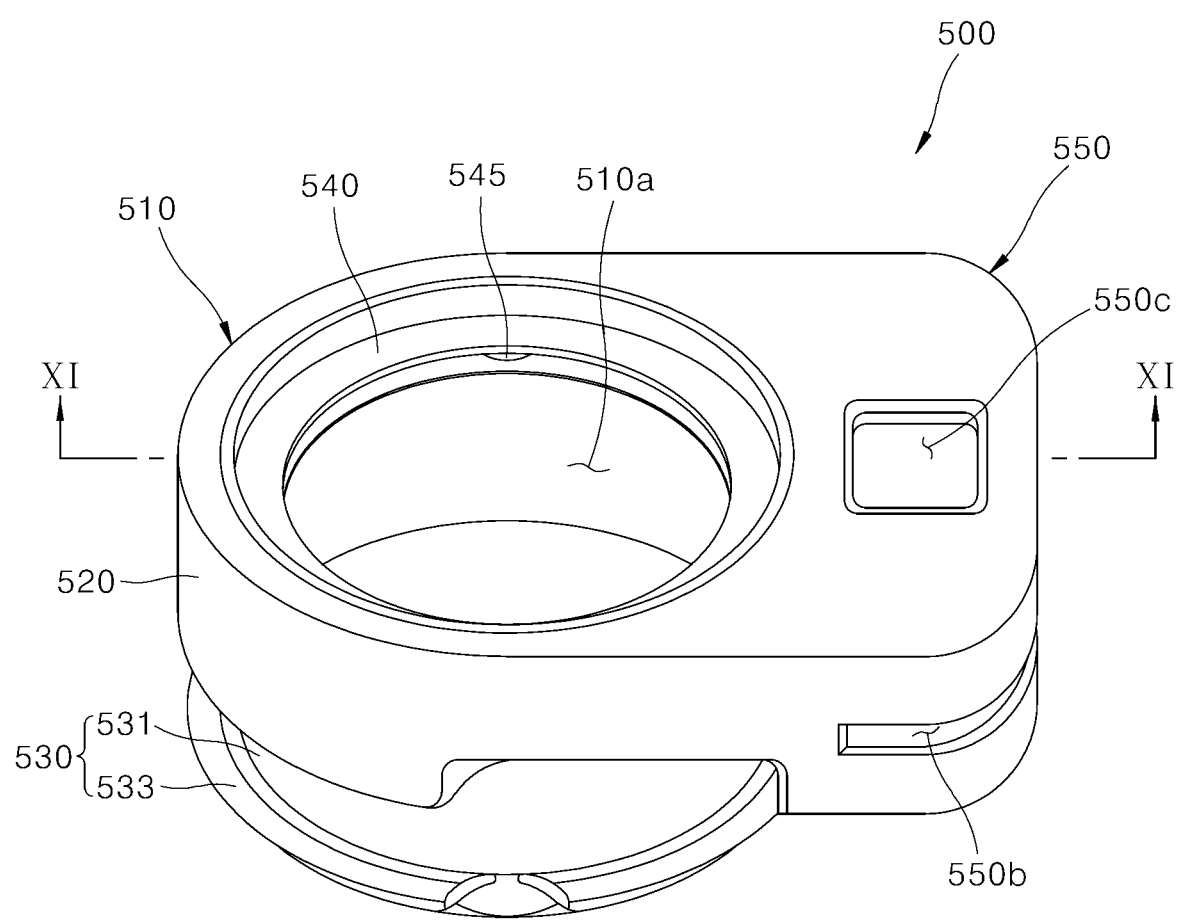
FIG. 10 is a perspective view of the holder in FIG. 8 which is separated.
Figure 11:
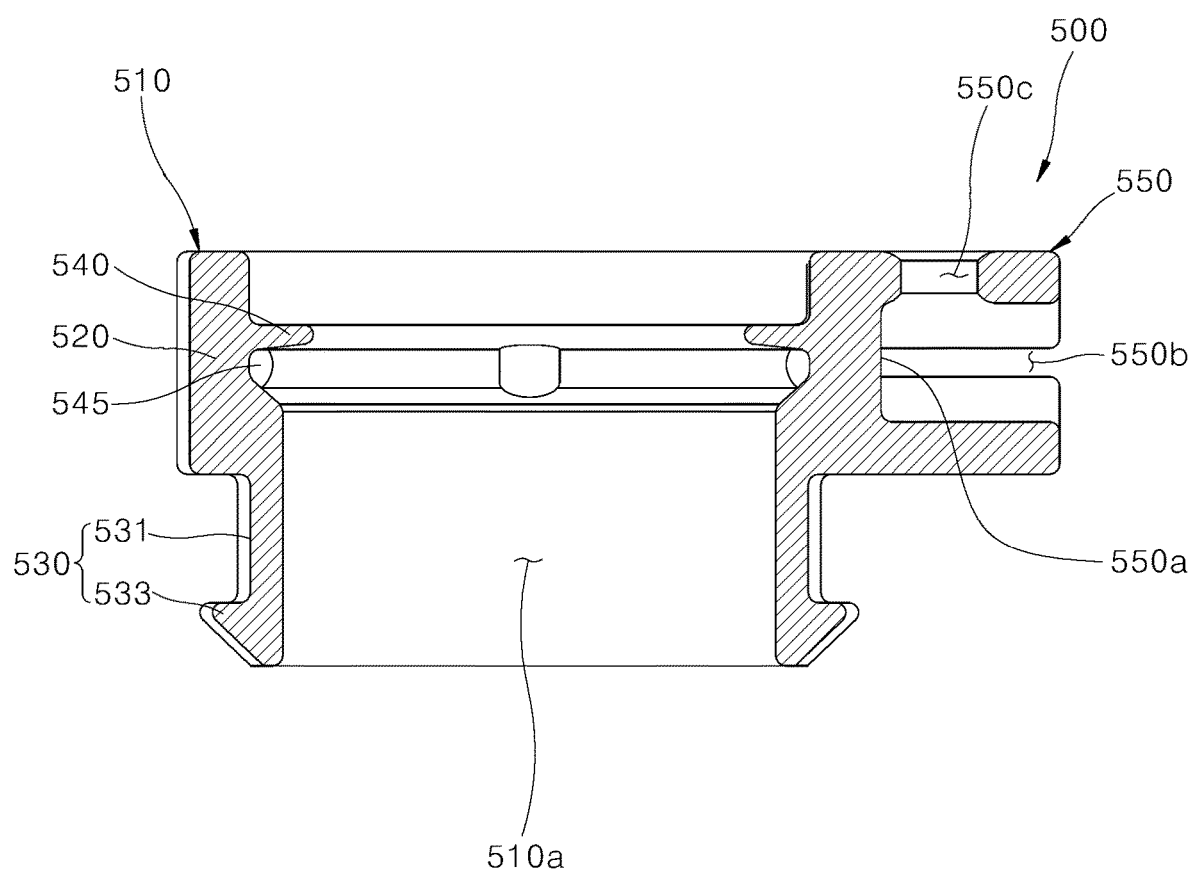
FIG. 11 is a cross-sectional view, taken along line "XI-XI" of FIG. 10.

FIG. 6 is a partially enlarged view of the cooking appliance in FIG. 2. FIG. 7 is an exploded perspective view of a sensing portion and a holder in FIG. 6 separated from a working coil. In addition, FIG. 8 is a perspective view showing a coupled state between a holder and a sensing portion, and FIG. 9 is a cross-sectional view, taken along line "IX-IX" of FIG. 8.

Referring to FIGS. 2, 6, and 7, an induction heating element 400 may include a working coil base 410 and a working coil 420. The working coil base 410 may be a structure to accommodate the working coil 420. The working coil base 410 may be made of a nonconductive material, for example. The working coil base 410 may be disposed above the base plates 108*a*, 108*b*, and 108*c*.

The working coil base 410 may include an insertion hole 411 at a central portion thereof. The insertion hole 411 may have a hollow shape penetrating the central portion of the working coil base 410 in a vertical direction.

The base plates 108*a*, 108*b*, and 108*c* may include a through-hole that communicates with the insertion hole 411. The through-hole may provide a passage to connect a space where the drive circuits 110*a*, 110*b*, and 110*c* are disposed and the insertion hole 411.

The working coil 420 may be disposed on the working coil base 410 and may be arranged to form a circular shape around the insertion hole 411. For example, a spiral groove may be defined on the working coil base 410 to receive the working coil 420 with respect to a center of the working coil base 410 including the insertion hole 411. The working coil 420 may be accommodated in the spiral groove and may be tightly wound around and coupled to the working coil base 410. An upper surface of the working coil 420 may be spaced apart from a lower surface of the cover plate 104.

A cooking appliance according to this embodiment may further include a sensing portion (sensor) 700 as shown in FIGS. 7 to 9. The sensing portion 700 may be inserted into a holder 500 described hereinafter and may be placed on induction heating element 400, for example, working coil base 410. The sensing portion 700 may include at least one of a temperature sensor 710, a supporting member (support) 720, a core 730, or a body 740.

The temperature sensor 710 may include an upper sensor 711 and a lower sensor 713. The upper sensor 711 may have a disk shape, for example. Further, the lower sensor 713 may have a cylindrical shape. An upper surface of the lower sensor 713 may be connected to a lower surface of the upper sensor 711. The temperature sensor 710 may have a T-shaped cross-section, for example.

The supporting member 720 may have a ring shape defining a hole. More specifically, the supporting member 720 may have the ring shape with a diameter that is larger than that of the upper sensor 711. An inner diameter of the supporting member 720 may approximately correspond to a diameter of the lower sensor 713. The supporting member 720 may be fitted to an outside of the lower sensor 713 and may be disposed under the upper sensor 711.

The core 730 may have a cylindrical shape defining a hole. The core 730 may be made of magnetic material, for example, ferrite. The core 730 increases density of magnetic flux induced in a sensing coil 750 when a current flows through the sensing coil 750 described hereinafter.

The core 730 may be disposed inside body 740 described hereinafter. The core 730 may accommodate the temperature sensor 710. That is, the lower sensor 713 of the temperature sensor 710 may be disposed inside the core 730 defining the hole. The supporting member 720 may have a ring shape with a diameter that is larger than that of the core 730 and may be disposed between the upper sensor 711 and the core 730. The supporting member 720 may be supported on the core 730 and may support the upper sensor 711 from under the upper sensor 711. Accordingly, the temperature sensor 710 may be disposed by inserting the lower sensor 713 into the core 730 and protruding the upper sensor 711 from a top of the core 730.

The body 740 may have a cylindrical shape defining a hole. The body 740 may provide an accommodating space to accommodate the core 730. The body 740 may include a bobbin 741 and a barrier 743.

The bobbin 741 may accommodate the core 730 and the sensing portion 700. The bobbin 741 may be inserted into the insertion hole 411 and may be disposed inside the working coil base 410. The sensing coil 750 may be disposed outside of the bobbin 741. The sensing coil 750 may be wound around and coupled to an outer circumferential surface of the bobbin 741. A current may be applied to the sensing coil 750 to identify a container to be heated.

The barrier 743 may be disposed on the bobbin 741 and may protrude from the bobbin 741 in a centrifugal or radial direction. The barrier 743 may support the body 740 at a predetermined height when the body 740 is inserted into the holder 500. As described hereinafter, the barrier 743 may be supported on the supporter 540 and the supporter 540 may support the body 740 inside the holder 500 by supporting the barrier 743 from below the barrier 743. Thus, the barrier 743 may rest on the supporter 540 protruding into hole.

A cooking appliance according to this embodiment may further include holder 500. The holder 500 may be inserted into and coupled to insertion hole 411 defined at a central portion of working coil base 410. Accordingly, the holder 500 may be disposed at a central portion of induction heating element 400. That is, the holder 500 of this embodiment may be inserted into the insertion hole 411 defined at the central portion of the working coil 420 from above the working coil base 410 and may be coupled to or separated from the working coil base 410.

The holder 500 may include a sensor insertion body 510 and a fuse insertion body 550. The sensor insertion body 510 may accommodate the sensing portion 700 in a receiving hole 510*a*. The receiving hole 510*a* may penetrate the holder 500, for example, the sensor insertion body 510 in a vertical direction. The receiving hole 510*a* provides a space to accommodate the sensing portion 700 inside the sensor insertion body 510 and may open an inside of the sensor insertion body 510, that is, the holder 500 toward cover plate 104.

The holder 500, for example, the sensor insertion body 510, may include an upper portion 520 and a lower portion 530. The upper portion 520 may be disposed at an upper portion of the sensor insertion body 510 and the lower portion 530 may be disposed under the upper portion 520. The upper portion 520 may have an inner diameter that is larger than that of the lower portion 530. That is, an inner circumferential surface of the lower portion 530 may protrude further than an inner circumferential surface of the upper portion 520 in a centrifugal direction.

The upper portion 520 may have a cylindrical shape defining a hole. The lower portion 530 may be disposed under the upper portion 520 and may be integrally formed with the upper portion 520.

The lower portion 530 may include a fitting body 531 and an engaging protrusion 533. The fitting body 531 may extend downward from the upper portion 520 and have a hollow cylindrical shape. The fitting body 531 may be inserted into the insertion hole 411 when the holder 500 is coupled to the working coil base 410.

The engaging protrusion 533 may be disposed under the fitting body 531 and may protrude from an outer circumferential surface of the fitting body 531 in a centrifugal direction. When the holder 500 is coupled to the working coil base 410, the engaging protrusion 533 may be caught by a lower side of the working coil base 410 to couple the holder 500 to the working coil base 410.

The holder 500 may include supporter 540. The supporter 540 may protrude from an inner circumferential surface of the holder 500 surrounding receiving hole 510, for example, an inner circumferential surface of sensor insertion body 510 in a centripetal direction. The supporter 540 may support sensing portion 700 inserted into the receiving hole 510*a* from below or may support a lower side of the sensing portion 700.

In this embodiment, the holder 500 is made of an elastically deformable material. Similar to the holder 500, the supporter 540 may be made of an elastically deformable material and may be integrated with the holder 500. For example, the holder 500 and the supporter 540 may be made of a material, such as an elastically deformable rubber or synthetic rubber, for example.

The supporter 540 may have a ring shape in which an outer circumferential surface thereof is connected to an inner circumferential surface of the holder 500, for example, the sensor insertion body 510. The supporter 540 may be disposed in the upper portion 520 of the sensor insertion body 510.

The supporter 540 may support the body 740, for example, the barrier 743 of the sensing portion 700 from below or may support a lower side of the barrier 743. For the supporting, the supporter 540 may protrude from an inner circumferential surface of the sensor insertion body 510, and may protrude to a length such that the supporter 540 overlaps with the barrier 743 in the vertical direction and does not overlap with the bobbin 741 in the vertical direction.

The supporter 540 may be elastically deformable in the vertical direction. More specifically, the supporter 540 may be elastically deformable in the vertical direction around one end connected to the inner circumferential surface of the sensor insertion body 510, that is, the outer circumferential surface of the supporter 540. The supporter 540 may support the sensing portion 700 from below or may support the lower side of the sensing portion 700 and elastically press the sensing portion 700 in an upward direction.

The sensing portion 700 inserted into the holder 500 may be disposed below the cover plate 104, and at least a portion of the sensing portion 700, for example, at least a portion of the temperature sensor 710 may protrude between the holder 500 and the cover plate 104. In this case, an upper surface of the upper sensor 711 may contact the cover plate 104. The supporter 540 may support the sensing portion 700 to maintain the contact between the upper surface of the upper sensor 711 and the cover plate 104.

For the contact, the supporter 540 may support the sensing portion 700 in a state in which the supporter 540 is elastically deformed downward. The supporter 540 supporting the sensing portion 700 in that state presses the sensing portion 700 upward to maintain the contact between the upper surface of the upper sensor 711 and the cover plate 104.

The supporter 540 may be inclined upward in the centripetal direction. That is, the supporter 540 may be inclined to increase a height of an inner circumferential surface of the supporter 540 with respect to an outer circumferential surface of the supporter 540 connected to the inner circumferential surface of the sensor insertion body 510. When the supporter 540 is inclined upward in the centripetal direction, even if the supporter 540 supports the sensing portion 700 to be elastically deformed downward, the supporter 540 may remain substantially side by side with the lower surface of the barrier 743.

In this case, a length in which the supporter 540 protrudes in the centripetal direction is increased and an area in which the supporter 540 supports the barrier 743 may be increased. Therefore, the supporter 540 may support the sensing portion 700 in a more stable state and may effectively inhibit the supporter 540 from falling down if an external force is applied to the sensing portion 700 in a downward direction.

The holder 500 according to this embodiment may further include a protrusion 545. The protrusion 545 may protrude from the inner circumferential surface of the holder 500, for example, the sensor insertion body 510. The protrusion 545 may be disposed under the supporter 540.

Similar to the supporter 540, the protrusion 545 may be disposed in the upper portion 520. More specifically, the protrusion 545 may be disposed between the supporter 540 and the lower portion 530. In this embodiment, it is exemplified that the protrusion 545 has a hemispherical shape. However, embodiments are not limited thereto and the protrusion 545 may have various shapes other than the hemispherical shape.

One or more of the protrusion 545 may be defined between the supporter 540 and the lower portion 530. A plurality of the protrusion 545 may be spaced apart from one another by a predetermined distance along a circumferential direction of the sensor insertion body 510. In this embodiment, four protrusions 545 are disposed. However, embodiments are not limited thereto, and three or less or five or more protrusions 545 may be provided.

The protrusion 545 may suppress or prevent the sensing portion 700 from falling down from the supporter 540. For example, the protrusion 545 may support the supporter 540 from below the supporter 540 and regulate a degree in which the supporter 540 is deformed downward to suppress any excessive deformation of the supporter 540 in the downward direction. When excessive deformation of the supporter 540 is suppressed or prevented, it is possible to stably suppress the falling down of the sensing portion 700 from the supporter 540 if the barrier 743 is separated from the supporter 540. The protrusion 545 may protrude to interfere with a lower surface of the barrier 743, thereby directly suppressing the sensing portion 700 from falling downward.

Holder 500 may further include fuse insertion portion 550 together with sensor insertion portion 510. The fuse insertion portion 550 and the sensor insertion portion 510 may also be referred to as fuse insertion body 550 and sensor insertion body 510.

The fuse insertion portion 550 may be disposed at one side of the sensor insertion body 510 and may be integrated with or integrally formed with the sensor insertion portion 510. That is, the holder 500 may include the sensor insertion portion 510 and the fuse insertion portion 550 which are integrated with each other. Accordingly, the fuse insertion portion 550 may be elastically deformable similar to the sensor insertion portion 510.

The fuse insertion portion 550 may include a fuse insertion groove 550*a*. The fuse insertion portion 550 may have a shape and size such that the fuse insertion portion 550 may accommodate a fuse. In this embodiment, the fuse insertion portion 550 has an approximately hexahedral shape, but it is noted that the fuse insertion portion 550 may have various shapes capable of stably accommodating the fuse.

The fuse may have a circular or polygonal rod shape, for example. The fuse insertion groove 550*a* into which the fuse 800 is inserted may be concave to correspond to the shape of the fuse.

The fuse insertion groove 550*a* may be disposed between an upper surface and a lower surface of the fuse insertion portion 550 and may be open in a lateral direction. For example, when the fuse insertion portion 550 is disposed on the right side of the sensor insertion portion 510, the fuse insertion groove 550*a* defined inside the fuse insertion portion 550 may be open toward the right side. Hereinafter, structure of the fuse insertion portion 550 is described by exemplifying the fuse insertion groove 550*a* opened to the right side.

In this structure, a lower side of the fuse insertion groove 550*a* is covered by a lower surface of the fuse insertion portion 550 and an upper side of the fuse insertion groove 550*a* is also covered by the upper surface of the fuse insertion portion 550. When a fuse 800 is inserted into the fuse insertion groove 550*a*, an upper surface and a lower surface of the fuse 800 may be covered by the fuse insertion portion 550 and the fuse 800 may be coupled inside the fuse insertion portion 550.

A space between the fuse 800 coupled inside the fuse insertion portion 550 and cover plate 104 may be blocked by the upper surface of the fuse insertion portion 550. In this case, the cover plate 104 may only contact the elastically deformable fuse insertion portion 550 and may not contact the fuse 800. Therefore, occurrence of a collision between the cover plate 104 and the fuse 800 may be prevented, and damage to the cover plate 104 or the fuse 800 due to the collision between the cover plate 104 and the fuse 800 may be prevented.

The fuse 800 may be inserted into the fuse insertion groove 550*a* through the open lateral side (right or left) of the fuse insertion groove 550*a*. A cut portion 550*b* may be defined on the lateral side (right or left) of the fuse insertion portion 550. The cut portion 550*b* may be formed by cutting a portion of the lateral side (right or left) of the fuse insertion portion 550. The cut portion 550*b* may open the fuse insertion groove 550*a* to an outside of the fuse insertion portion 550 at the lateral side (right or left) of the fuse insertion groove 550*a*. Therefore, a path to insert the fuse 800 into the fuse insertion groove 550*a* may be provided on the lateral side (right or left) of the fuse insertion body 550 by the cut portion 550*b*.

The cut portion 550*b* may be disposed approximately at a central portion of the fuse insertion portion 550 in a vertical direction. The cut portion 550*b* may extend from the lateral (right or left) surface of the fuse insertion portion 550 in a forward and rearward direction and may extend to a front surface and a rear surface of the fuse insertion portion 550. That is, the cut portion 550*b* may be disposed over three surfaces of the fuse insertion portion 550 to thereby provide higher flexibility for inserting the fuse 800.

The cut portion 550*b* may facilitate insertion of the fuse 800 and provide a passage to take out signal lines connected to both ends of the fuse 800. That is, as the cut portion 550*b* may have a length which is longer than that of the lateral (right or left) surface of the fuse insertion portion 550, the lateral side (right or left) of the fuse insertion groove 550*a* may be open wider, thereby facilitating insertion of the fuse. Portions of the cut portion 550*b* defined on the front surface and the rear surface of the fuse insertion portion 550 may provide a path to take out or guide signal lines connected to the both ends of the fuse 800.

The fuse insertion portion 550 may include an exposed hole 550*c* on an upper surface thereof. The exposed hole 550*c* may penetrate the upper surface of the fuse insertion portion 550 in the vertical direction. The exposed hole 550*c* may expose a portion of the fuse insertion groove 550*a* above the fuse insertion portion 550. The exposed hole 550*c* may have a size which is smaller than that of the upper surface of the fuse insertion portion 550 and a portion of the fuse 800 accommodated in the fuse insertion portion 550 may be exposed to the outside or may be visible through the exposed hole 550*c*.

Hereinafter, operations and effects of a holder according to this embodiment will be described with reference to FIGS. 6 to 11.

Holder 500 is inserted into and coupled to insertion hole 411 defined at a central portion of working coil base 410 and is disposed at a central portion of induction heating element 400. The holder 500 may include sensor insertion portion 510 and fuse insertion portion 550, which may be integrated with each other or integrally formed. The sensor insertion portion 510 and the fuse insertion portion 550 may be elastically deformably.

Sensing portion 700 may be disposed in the sensor insertion portion 510 of the holder 500. The sensing portion 700 may be inserted into the sensor insertion portion 510 through receiving hole 510*a* defined in the sensor insertion portion 510 and may be disposed in the holder 500.

The sensing portion 700 inserted into the sensor insertion portion 510 may be supported by supporter 540. More specifically, the supporter 540 may protrude from an inner circumferential surface of the sensor insertion portion 510 and body 740 of the sensing portion 700, for example, barrier 743 may be supported on the supporter 540. The supporter 540 may be elastically deformable in the vertical direction, support the sensing portion 700 from below the sensing portion 700, and may elastically press the sensing portion 700 in the upward direction.

The sensing portion 700 inserted into the holder 500 may be disposed below cover plate 104 and at least a portion of the sensing portion 700, for example, at least a portion of temperature sensor 710 may protrude between the holder 500 and the cover plate 104. In this case, the upper surface of the sensing portion 700, for example, an upper sensor 711, may contact the cover plate 104. The supporter 540 may support the sensing portion 700 to maintain contact between the sensing portion 700, for example, the upper surface of the upper sensor 711, and the cover plate 104.

The supporter 540 may support the sensing portion 700 in a state in which the supporter 540 is elastically deformed in the downward direction. The supporter 540 supporting the sensing portion 700 in that state may press the sensing portion 700 in the upward direction to maintain contact between the upper surface of the upper sensor 711 and the cover plate 104.

When the cover plate 104 is pressed downward due to an impact applied to the cover plate 104 in a state in which the sensing portion 700 contacts the cover plate 104, the sensing portion 700 may also be moved downward together with the cover plate 104. As the sensing portion 700 is elastically supported by the supporter 540, when the sensing portion 700 receives a downward-pressing force, the supporter 540 is deformed in the downward direction and the sensing portion 700 may be moved in the downward direction.

That is, even if the cover plate 104 is pressed downward due to the impact applied to the cover plate 104, the sensing portion 700 also moves downward with the cover plate 104 to absorb the impact applied between the cover plate 104 and the sensing portion 700. The cover plate 104 and the sensing portion 700 collide with each other due to the impact applied to the cover plate 104 and damage to the cover plate 104 or the sensing portion 700 occurring due to the impact, which is caused by the collision, may be effectively inhibited.

Further, the supporter 540 may be inclined upward in a centripetal direction. When the supporter 540 is inclined upward in the centripetal direction, a protruding length of the supporter 540 in the centripetal direction may be increased and an area of supporting the barrier 743 by the supporter 540 may be increased. In this case, the supporter 540 may support the sensing portion 700 in a more stable state and may effectively inhibit falling down of the sensing portion 700 from the supporter 540 due to an external force applied to the sensing portion 700 in the downward direction.

A plurality of protrusions 545 may be defined between the supporter 540 and lower portion 530. The protrusions 545 may inhibit the sensing portion 700 from falling down from the supporter 540.

In summary, the holder 500 of this embodiment elastically supports the sensing portion 700 using the supporter 540, thereby increasing a degree of contact or improving reliable contact between the cover plate 104 and the sensing portion 700, resulting in improved accuracy in a temperature measurement result and may effectively suppress damage to the cover plate 104 or the sensing portion 700 by reducing the impact applied between the cover plate 104 and the sensing portion 700.

The holder 500 of this embodiment may stably support the sensing portion 700 using the supporter 540 inclined upward in the centripetal direction and the plurality of protrusions 545 defined between the supporter 540 and the lower portion 530. Therefore, the holder may stably and effectively provide a function for improving contact between the cover plate 104 and the sensing portion 700 and a function for reducing impact applied to the cover plate 104 and the sensing portion 700.

The holder 500 of this embodiment may further include fuse insertion portion 550 which may be integrated with the sensor insertion portion 510. The holder 500 may accommodate the sensing portion 700 and the fuse 800, thereby reducing a number of processes to assemble the sensing portion 700 and the fuse 800 and contributing to improving components management and stability of mounting the sensing portion 700 and the fuse 800.

The fuse insertion portion 550 of the holder 500 may accommodate the fuse 800 by surrounding an upper portion and a lower portion of the fuse 800 to block exposure of the fuse 800 toward the cover plate 104. The holder 500 including the fuse insertion portion 550 may prevent a collision between the cover plate 104 and the fuse 800 due to an impact applied to the cover plate 104 and effectively inhibit damage to the cover plate 104 or the fuse 800 due to the collision between the cover plate 104 and the fuse 800.

Figure 12:
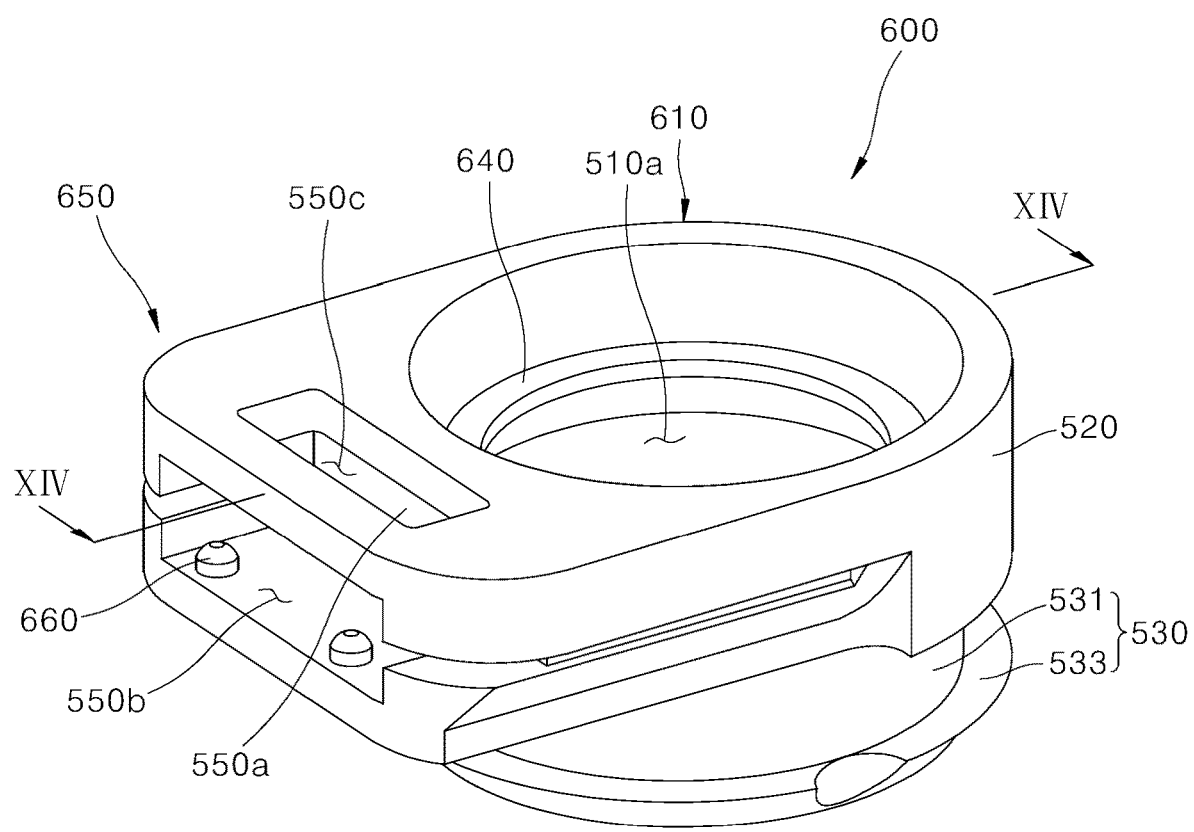
FIGS. 12 and 13 are perspective views of a holder according to another embodiment.
Figure 13:
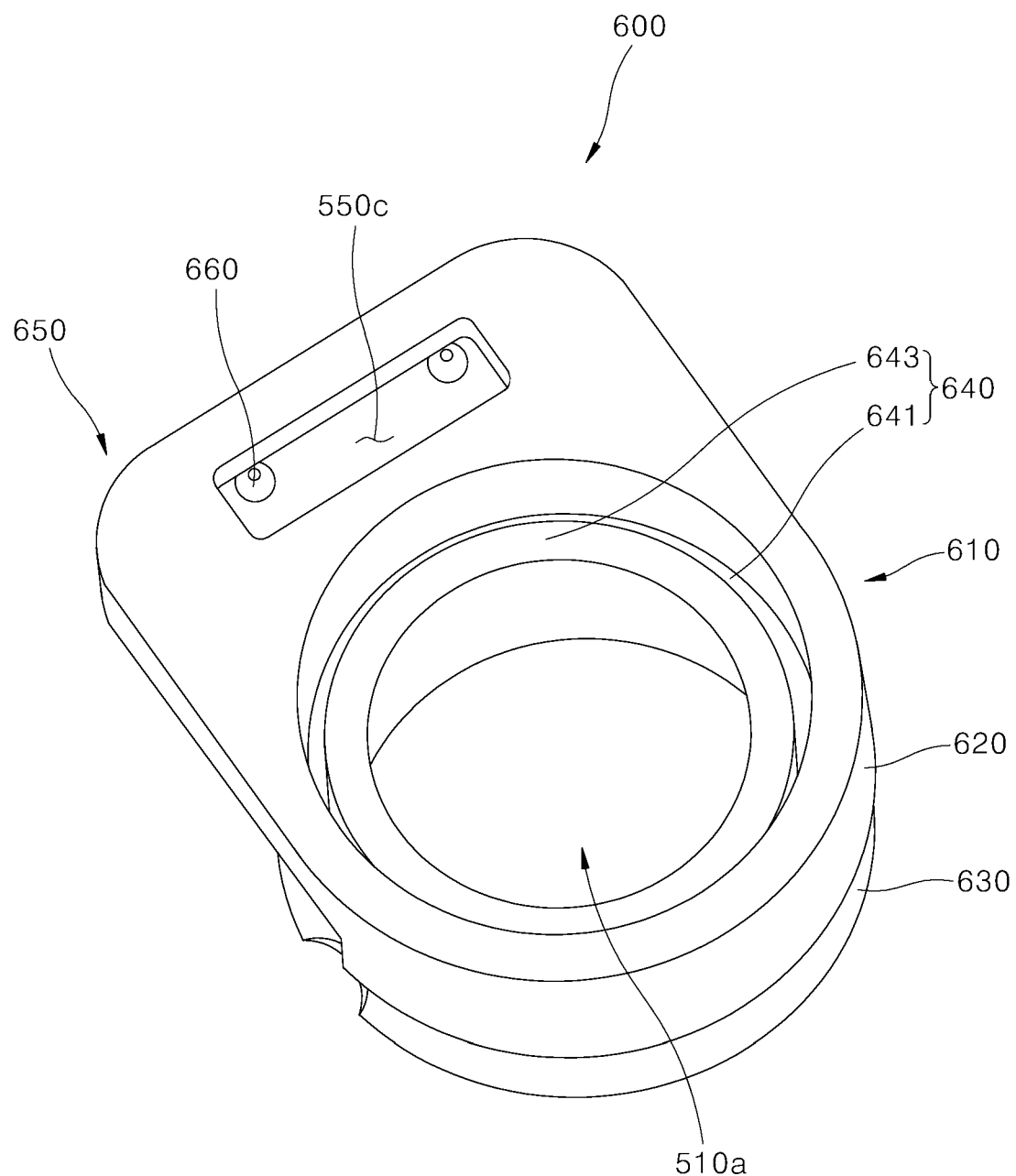
Figure 14:
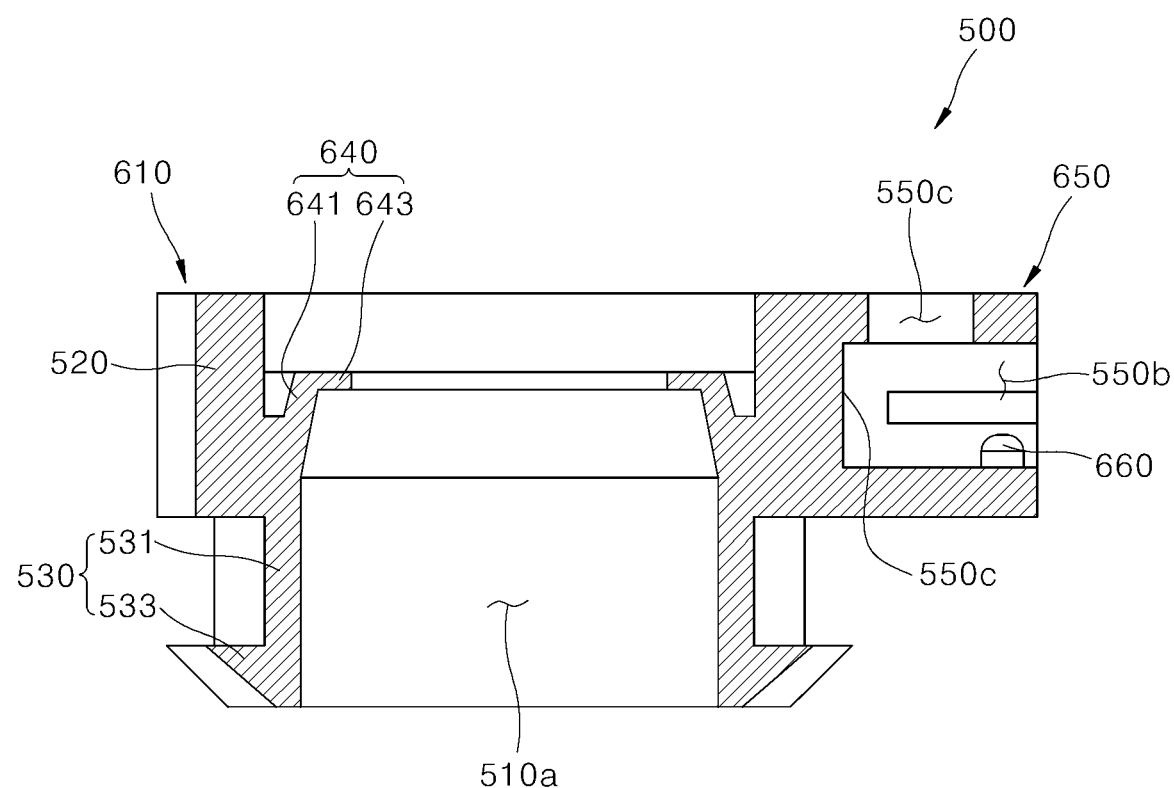
FIG. 14 is a cross-sectional view, taken along the line "XIV-XIV" of FIG. 12.
Figure 15:
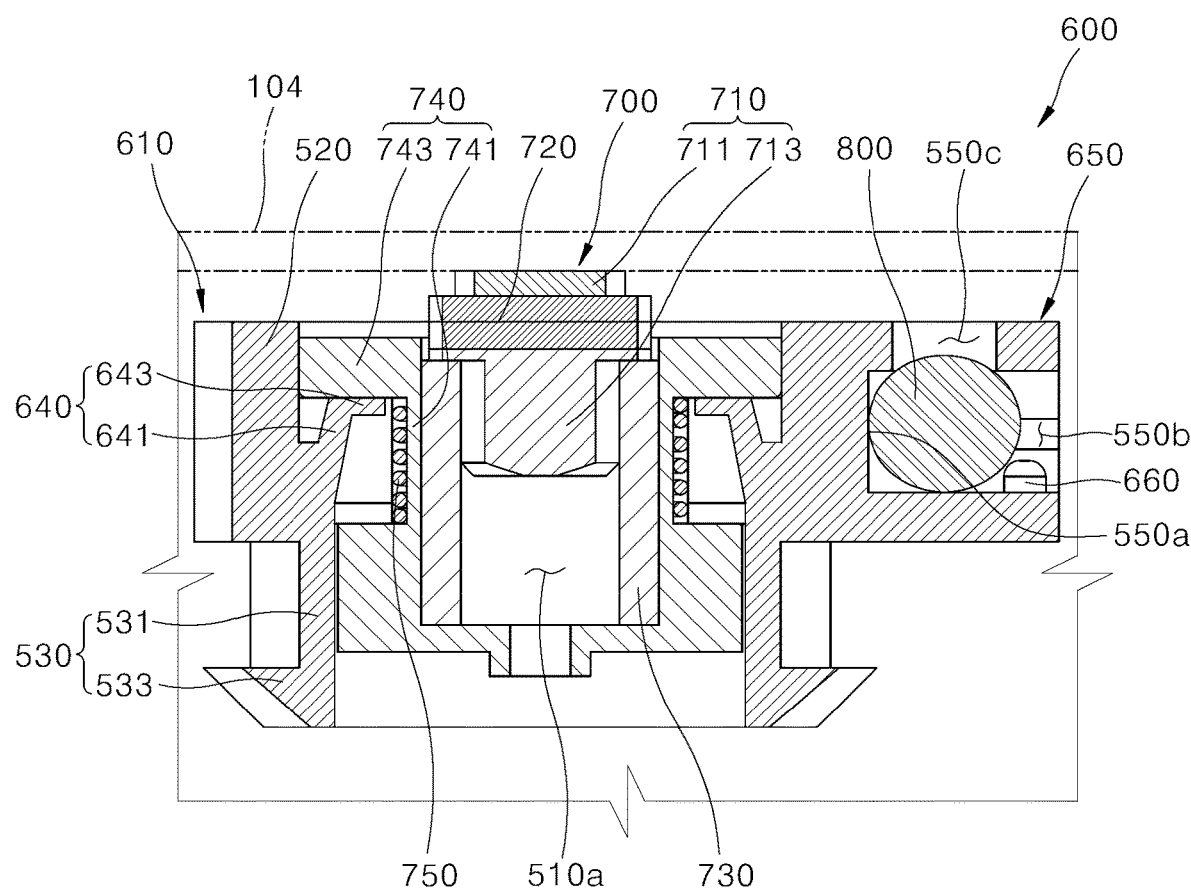
FIG. 15 is a cross-sectional view showing a coupled state between the holder in FIG. 14 and a sensing portion.
Figure 16:
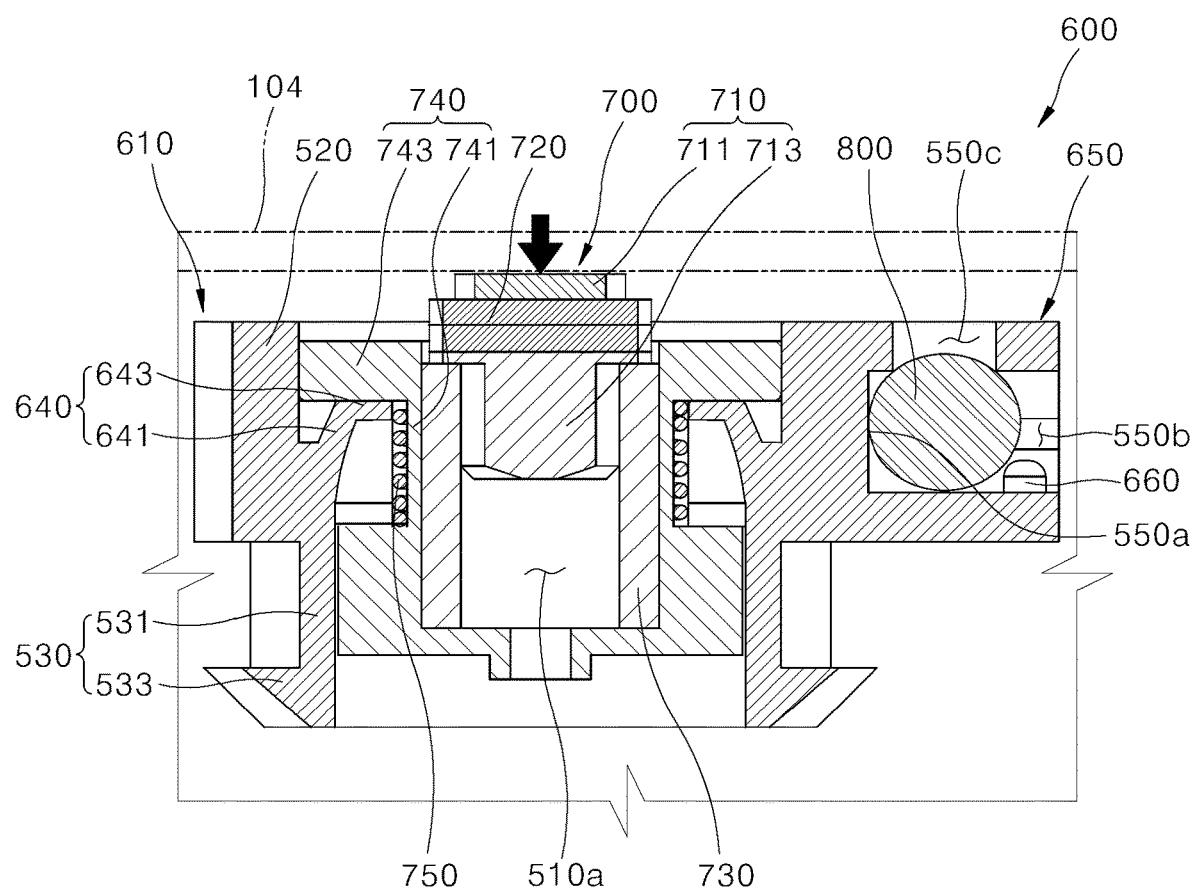
FIG. 16 shows a deformed state of the supporter in FIG. 15.

FIGS. 12 and 13 are perspective views of a holder according to another embodiment. FIG. 14 is a cross-sectional view, taken along line "XIV-XIV" of FIG. 12. In addition, FIG. 15 is a cross-sectional view showing a coupled state between the holder in FIG. 14 and a sensing portion, and FIG. 16 shows a deformed state of the supporter in FIG. 15.

Referring to FIGS. 12 to 15, a holder 600 according to another embodiment may include a sensor insertion portion 610 and a fuse insertion portion 650 similar to the holder 500 (see FIG. 9) of the above-mentioned embodiment. A main difference between the holder 600 according to this embodiment and the holder 500 of the above-mentioned embodiment is a structure of supporter 640.

The supporter 640 of this embodiment may include a first supporter 641 and a second supporter 643. The first supporter 641 may be made of elastically deformable material and may protrude from an inner circumferential surface of the sensor insertion portion 610. The first supporter 641 may protrude from the inner circumferential surface of the sensor insertion portion 610 and extend in an upward direction.

More specifically, the first supporter 641 may be inclined upward in a centripetal direction. That is, the first supporter 641 may be inclined to increase a height of the inner circumferential surface of the first supporter 641 with respect to an outer circumferential surface of the first supporter 641 connected to the inner circumferential surface of the sensor insertion portion 610. The first supporter 641 may be inclined upward in a direction that is more biased to a top than the supporter 540 exemplified in the above-mentioned embodiment. In this embodiment, it is exemplified that the first supporter 641 has a shape of a truncated cone with a cavity.

According to this embodiment, a stepped portion may be defined between upper portion 520 and lower portion 530 to protrude from an inner circumferential surface of the lower portion 530 more than an inner circumferential surface of the upper portion 520 in the centripetal direction. The first supporter 641 may protrude from a boundary surface between the upper portion 520 and the lower portion 530 defining the stepped portion.

The first supporter 641 may be elastically deformable in a vertical direction about one end connected to the inner circumferential surface of the sensor insertion portion 610, that is, an outer circumferential surface of the first supporter 641. The second supporter 643 may extend from an upper side of the first supporter 641 in the centripetal direction. The second supporter 643 may have a ring shape such that an outer circumferential surface thereof is connected to the upper side of the first supporter 641. The second supporter 643 may be disposed in the upper portion 520 of the sensor insertion portion 610.

The second supporter 643 may support body 740 of sensing portion 700, for example, barrier 743 from below the barrier 743. For the supporting, the second supporter 643 may protrude from the upper side of the first supporter 641 and may protrude to a length such that the second supporter 643 overlaps with the barrier 743 in the vertical direction and does not overlap with bobbin 741 in the vertical direction.

Further, the second supporter 643 may form a plane in parallel to a lower surface of the barrier 743. That is, the second supporter 643 may have a ring shape and an upper surface of the second supporter 643 facing the lower surface of the barrier 743 may form a plane in parallel to the lower surface of the barrier 743. The second supporter 643 may surface-contact the barrier 743 and may stably support the sensing portion 700. The second supporter 643 may be elastically deformable in the vertical direction around one end connected to the upper side of the first supporter 641, that is, an outer circumferential surface of the second supporter 643.

The supporter 640 including the first supporter 641 and the second supporter 643 may support the sensing portion 700 from under the sensing portion 700 and may elastically press the sensing portion 700 in the upward direction. In this case, the second supporter 643 directly supports the sensing portion 700 and the first supporter 641 supports the second supporter 643 and the sensing portion 700 elastically deformed in the downward direction to provide the supporter 640 with an elastic force to press the sensing portion 700 in the upward direction. Therefore, an upper surface of the upper sensor 711 may contact cover plate 104.

When the cover plate 104 is pressed downward due to an impact applied to the cover plate 104 in a state in which the sensing portion 700 contacts the cover plate 104, the sensing portion 700 may also move downward together with the cover plate 104, as shown in FIG. 16. In this case, the first supporter 641 of the supporter 640 that elastically supports the sensing portion 700 may be rotated downward about one end connected to the inner circumferential surface of the sensor insertion portion 610 and may be deformed.

As the first supporter 641 is deformed, the second supporter 643 moves downward together with the first supporter 641. In this case, the second supporter 643 may be deformed by moving in the centripetal direction while rotating about one end connected to the first supporter 641 to maintain a state in parallel to the barrier 743.

Alternatively, even if the second supporter 643 cannot be deformed by moving in a more centripetal direction than before due to the ring shape of the second supporter 643, a force of pressing the second supporter 643 in the centripetal direction is applied to the second supporter 643. The force applied to the second supporter 643 may act as a force for supporting the sensing portion 700 more strongly by the second supporter 643. Therefore, the second supporter 643 may support the sensing portion 700 in the centripetal direction more than before or stably support the sensing portion 700 with a stronger force than before.

The holder 600 of this embodiment including the supporter 640 may stably support the sensing portion 700 while effectively inhibiting falling of the sensing portion 700 down to the supporter 540 without an additional structure such as a protrusion.

The fuse insertion portion 650 may further include a fixing protrusion 660. The fixing protrusion 660 may be defined inside the fuse insertion portion 650 in which a fuse insertion groove 550a is formed and may protrude from at least one of an upper surface or a bottom surface of the fuse insertion portion 650. In this embodiment, the fixing protrusion 660 protrudes from the bottom surface of the fuse insertion portion 650; however, embodiments are not limited thereto.

The fixing protrusion 660 may adjust a position of fuse 800 inserted into the fuse insertion groove 550a. That is, the fixing protrusion 660 may block separation of the fuse 800 to an outside of the fuse insertion portion 650 through cut portion 550b and may stably maintain a mounted state of the fuse 800.

The fixing protrusion 660 may also be integrated with the holder 500 and may be made of an elastically deformable material. Therefore, when the fuse 800 is inserted into the fuse insertion groove 550a, the fixing protrusion 660 may be appropriately deformed to facilitate insertion of the fuse 800.

Embodiments disclosed herein provide a cooking appliance having an improved structure to reduce an impact applied between a cover plate and a temperature sensor while increasing a degree of contact between the cover plate and the temperature sensor. Embodiments disclosed herein further provide a cooking appliance having the improved structure to stably fix a fuse and easily assemble the fuse. Embodiments disclosed herein furthermore provide a cooking appliance having an improved structure to reduce a number of processes needed to assemble a temperature sensor and a fuse.

Embodiments disclosed herein provide a cooking appliance that may include a case providing an inner space; a cover plate that covers the case; an induction heating element disposed in the case; at least one holder coupled to the induction heating element, the holder including a receiving hole open toward the cover plate, and a sensing portion or sensor inserted into the receiving hole and having at least a portion that protrudes from the holder toward the cover plate. The holder may include a supporter that protrudes into the receiving hole from an inner circumferential surface of the holder. The supporter may be configured to support the sensing portion.

The induction heating cooking appliance may include a case, a working coil, and a cover plate. A substrate may be disposed inside the case and a base plate may be disposed in the case.

A working coil may be disposed on the base plate. The working coil may include an insulating sheet and a ferrite. The working coil may be disposed on the insulating sheet. The ferrite may be disposed on the base plate.

The cover plate may be disposed on the case. More specifically, the cover plate may be disposed on the working coil. An object to be heated may be placed on the cover plate.

The working coil may form a magnetic field using a current flowing through the working coil. The magnetic field may generate heat in the cooking container itself, which is an object to be heated placed on the cover plate, by the induction heating. The generated heat may heat food contained in the cooking container.

The induction heating cooking appliance may include a temperature sensor to measure a temperature. The temperature sensor may measure the temperature of the cover plate in contact with the cover plate. The temperature sensor may be placed on the working coil base constituting the working coil.

According to embodiments disclosed herein, a holder may be disposed in an induction heating element provided below a cover plate. A supporter may be disposed inside the holder to support a sensing portion or sensor inserted into the holder to thereby reliably provide contact between the sensing portion and the cover plate.

The holder may be disposed in the induction heating element disposed below the cover plate and a supporter disposed inside the holder may elastically support the sensing portion inserted into the holder in a direction contacting the cover plate. With this configuration, it is possible to reduce impact applied between the cover plate and the sensing portion while increasing a degree of contact between the cover plate and the sensing portion.

The supporter may be elastically deformable in a vertical direction and may support the sensing portion from under the supporter. The sensing portion may be elastically pressed in an upward direction by the supporter, if the sensing portion is elastically moved downwardly.

The holder may include a sensor insertion portion to accommodate the sensing portion and a fuse insertion portion to accommodate a fuse. The sensor insertion portion and the fuse insertion portion may be integrally formed or integrated with each other. The sensing portion and the fuse may be disposed together in a single holder, thereby reducing a number of processes needed to assemble the sensing portion and the fuse.

A space between the fuse disposed in the holder, and a cover plate may be blocked or maintained by an upper portion of the holder. A fuse insertion groove into which the fuse may be inserted may be concave in the fuse insertion portion and may be disposed between an upper portion and a lower portion of the fuse insertion portion.

Further, the fuse insertion portion may include a cutting or cut portion to laterally open the fuse insertion groove between the upper portion and the lower portion of the fuse insertion portion. With this configuration, the fuse may be wrapped by the holder to prevent exposure of the fuse to the cover plate, thereby preventing collision between the cover plate and the fuse due to impact applied to the cover plate.

Embodiments disclosed herein provide a cooking appliance that may include a case defining an opening at an upper side thereof and configured to provide an inner space; a cover plate configured to cover the upper side of the case; an induction heating element disposed in the inner space of the case; holders disposed in the inner space of the case and coupled to the induction heating element; and a sensing portion or sensor inserted into the holders and having at least a portion that protrudes between each of the holders and the cover plate. The holders may include a receiving hole to open an inside of the holders toward the cover plate. The sensing portion may be inserted into the receiving hole. The holders may include a supporter that protrudes from an inner circumferential surface of the holders surrounding the receiving hole in a centripetal direction and configured to support the sensing portion from under the sensing portion.

The supporter may be elastically deformable in a vertical direction. Further, the supporter may be configured to support the sensing portion by being elastically deformed downward. The supporter may be inclined upward in the centripetal direction.

The cooking appliance include a protrusion that protrudes from the inner circumferential surface of the holder in the centripetal direction. The protrusion may be disposed under the supporter. The supporter may have a ring shape such that an outer circumferential surface of the supporter is connected to the inner circumferential surface of the holder.

A plurality of protrusions may be spaced apart from one another by a predetermined distance along a circumferential direction of the holder. Further, the protrusion may have a hemispherical shape.

The holder may include an upper portion in which the supporter may be disposed and a lower portion disposed under the upper portion. An inner circumferential surface of the lower portion may protrude further than an inner circumferential surface of the upper portion in the centripetal direction.

The supporter may be disposed in the upper portion. The protrusion may be disposed between each of the supporter and the lower portion.

The supporter may include a first supporter that extends from the inner circumferential surface of the holder in an upward direction, and a second supporter that extends from an upper side of the first supporter in a centripetal direction to support the sensing portion from the lower side of the sensing portion. The first supporter may be elastically deformable in the vertical direction around one end connected to the inner circumferential surface of the holder The holder may include an upper portion in which the supporter may be disposed and a lower portion disposed under the upper portion. The inner circumferential surface of the lower portion may protrude further than the inner circumferential surface of the upper portion in the centripetal direction, and the first supporter may protrude from a boundary surface between the upper portion and the lower portion, defining a stepped portion.

The holder may include a sensor insertion portion including the receiving hole, and a fuse insertion portion disposed at one side of the sensor insertion portion and defining a fuse insertion groove into which a fuse may be inserted. The sensor insertion portion may be integrated or integrally formed with the fuse insertion portion.

The fuse insertion groove may be concave in the fuse insertion portion. A space between the fuse insertion groove and the cover plate may be blocked by an upper surface of the fuse insertion portion. The fuse insertion portion may include a cutting or cut portion to laterally open the fuse insertion groove.

The sensing portion may include a temperature sensor. Further, the sensing portion may include a core to accommodate the temperature sensor, and a body to accommodate the core. The body may include a bobbin to accommodate the temperature sensor and the core and that is inserted into the receiving hole, and a barrier that protrudes from the bobbin in a centrifugal direction.

The supporter may be configured to support the barrier from under the barrier. The supporter of the holder may elastically support the sensing portion to increase a degree of contact or improve contact between the cover plate and the sensing portion, thereby improving accuracy in temperature measurement. Thus, reliable contact may be provided. Further, the cooking appliance may reduce impact applied between the cover plate and the sensing portion, thereby effectively inhibiting damage to the cover plate or the sensing portion.

The holder may wrap the fuse to block exposure of the fuse to the cover plate, thereby preventing collision between the cover plate and the fuse due to impact applied to the cover plate and may effectively prevent damage to the cover plate or the fuse due to collision between the cover plate and the fuse.

The sensing portion and the fuse may be mounted together in a holder, thereby reducing a number of processes to assemble the sensing portion and the fuse, facilitating component management, and improving mounting stability of the sensing portion and the fuse.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A cooking appliance, comprising:
a case having an opening at an upper side thereof and an inner space;
a cover plate configured to cover the upper side of the case;
at least one induction heating element disposed in the inner space of the case;
at least one holder disposed in the inner space of the case and coupled to the at least one induction heating element; and
a sensor inserted into the at least one holder having at least a portion that protrudes between the at least one holder and the cover plate, wherein the at least one holder comprises a receiving hole open at an inside of the at least one holder toward the cover plate, wherein the sensor is inserted into the receiving hole, wherein a supporter protrudes from an inner circumferential surface of the at least one holder and surrounds the receiving hole in a centripetal direction and is configured to support the sensor from underneath the sensor, and wherein the sensor comprises a temperature sensor, a core to accommodate the temperature sensor, and a body to accommodate the core, wherein the body comprises a bobbin to accommodate the temperature sensor and the core and that is inserted into the receiving hole and a barrier that protrudes from the bobbin in a centrifugal direction, and wherein the supporter is configured to support the barrier from underneath the barrier.

2. The cooking appliance of claim 1, wherein the supporter is elastically deformable in a vertical direction.

3. The cooking appliance of claim 2, wherein the supporter is configured to support the sensor by being elastically deformed downward.

4. The cooking appliance of claim 3, wherein the supporter is inclined upward in the centripetal direction.

5. The cooking appliance of claim 1, wherein at least one protrusion protrudes from the inner circumferential surface of the at least one holder in the centripetal direction, and wherein the at least one protrusion is disposed under the supporter.

6. The cooking appliance of claim 5, wherein the supporter has a ring shape such that an outer circumferential surface of the supporter is connected to the inner circumferential surface of the at least one holder, and wherein the at least one protrusion comprises a plurality of protrusions spaced apart from one another by a predetermined distance along a circumferential direction of the at least one holder.

7. The cooking appliance of claim 6, wherein each of the plurality of protrusions has a hemispherical shape.

8. The cooking appliance of claim 6, wherein the at least one holder comprises an upper area at which the supporter is disposed and a lower area disposed under the upper area, wherein an inner circumferential surface of the lower area protrudes further than an inner circumferential surface of the upper area in the centripetal direction, wherein the supporter is disposed in the upper area, and wherein the plurality of protrusions is disposed between the supporter and the lower area.

9. The cooking appliance of claim 1, wherein the at least one holder comprises:
    a sensor insertion body comprising the receiving hole; and
    a fuse insertion body and disposed at one side of the sensor insertion body and defining a fuse insertion groove into which a fuse is inserted.

10. The cooking appliance of claim 9, wherein the sensor insertion body is integrated with the fuse insertion body.

11. The cooking appliance of claim 9, wherein the fuse insertion groove is concave in the fuse insertion body, and wherein a space between the fuse insertion groove and the cover plate is blocked by an upper surface of the fuse insertion body.

12. The cooking appliance of claim 11, wherein the fuse insertion body comprises a cut portion that forms a lateral opening of the fuse insertion groove.

* * * * *